(12) United States Patent
Nakano et al.

(10) Patent No.: US 12,535,334 B2
(45) Date of Patent: Jan. 27, 2026

(54) AUTONOMOUS TRAVEL ROUTE PLANNING METHOD, AUTONOMOUS TRAVELING METHOD, AND PROGRAM

(71) Applicant: MURATA MACHINERY, LTD., Kyoto (JP)

(72) Inventors: Tsuyoshi Nakano, Kyoto (JP); Yuki Denda, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 339 days.

(21) Appl. No.: 18/020,300

(22) PCT Filed: Mar. 29, 2021

(86) PCT No.: PCT/JP2021/013311
§ 371 (c)(1),
(2) Date: Feb. 8, 2023

(87) PCT Pub. No.: WO2022/038823
PCT Pub. Date: Feb. 24, 2022

(65) Prior Publication Data
US 2023/0288221 A1 Sep. 14, 2023

(30) Foreign Application Priority Data
Aug. 17, 2020 (JP) .................... 2020-137617

(51) Int. Cl.
*G01C 21/00* (2006.01)
*G05D 1/00* (2024.01)
(52) U.S. Cl.
CPC .......... *G01C 21/3804* (2020.08); *G05D 1/02* (2013.01)

(58) Field of Classification Search
None
See application file for complete search history.

(56) References Cited

U.S. PATENT DOCUMENTS

| | | | |
|---|---|---|---|
| 11,274,930 B1 * | 3/2022 | Madhivanan | ........ G01C 15/002 |
| 11,561,102 B1 * | 1/2023 | Ebrahimi Afrouzi | ........................ G05D 1/0272 |
| 2016/0062361 A1 | 3/2016 | Nakano et al. | |

(Continued)

FOREIGN PATENT DOCUMENTS

| JP | 2014-219721 A | 11/2014 |
|---|---|---|
| JP | 2016-024598 A | 2/2016 |

(Continued)

OTHER PUBLICATIONS

Official Communication issued in corresponding European Patent Application No. 21857975.3, mailed on Jul. 23, 2024.

(Continued)

*Primary Examiner* — Lail A Kleinman
(74) *Attorney, Agent, or Firm* — Keating & Bennett, LLP

(57) ABSTRACT

An autonomous travel route planning method includes creating a global map including obstacle information indicating an obstacle existing in a movement environment, setting an outer peripheral boundary corresponding to an outer periphery of a travel area by associating the outer peripheral boundary with the global map, creating a route creation map in which the obstacle information existing inside the outer peripheral boundary is deleted, and creating the filling travel route to fill in the travel area included in the route creation map.

13 Claims, 27 Drawing Sheets

(56) References Cited

U.S. PATENT DOCUMENTS

| | | | |
|---|---|---|---|
| 2019/0120633 A1 | 4/2019 | Afrouzi et al. | |
| 2019/0208978 A1 | 7/2019 | Shitamoto et al. | |
| 2020/0249013 A1* | 8/2020 | Zweigle | G01B 11/2513 |
| 2021/0096579 A1 | 4/2021 | Artes et al. | |
| 2021/0254991 A1* | 8/2021 | Parida | G01C 21/3623 |
| 2022/0279698 A1* | 9/2022 | Yoshimura | A01B 69/008 |

FOREIGN PATENT DOCUMENTS

| | | |
|---|---|---|
| JP | 2018-005470 A | 1/2018 |
| JP | 2019-525342 A | 9/2019 |
| WO | 2018/043180 A1 | 3/2018 |

OTHER PUBLICATIONS

Official Communication issued in International Patent Application No. PCT/JP2021/013311, mailed on Jun. 15, 2021.

\* cited by examiner

| | | | | | | | | |
|---|---|---|---|---|---|---|---|---|
| $T_0$ | $x_0$ | $y_0$ | $\theta_0$ | | $S_0$ | $W_0$ | $P_0$ | |
| $T_1$ | $x_1$ | $y_1$ | $\theta_1$ | | $S_1$ | $W_1$ | $P_1$ | |
| $T_2$ | $x_2$ | $y_2$ | $\theta_2$ | ...... | $S_2$ | $W_2$ | $P_2$ | |
| $T_3$ | $x_3$ | $y_3$ | $\theta_3$ | | $S_3$ | $W_3$ | $P_3$ | |
| $T_{n-1}$ | $x_{n-1}$ | $y_{n-1}$ | $\theta_{n-1}$ | | $S_{n-1}$ | $W_{n-1}$ | $P_{n-1}$ | |
| $T_n$ | $x_n$ | $y_n$ | $\theta_n$ | | $S_n$ | $W_n$ | $P_n$ | |

500

ELAPSED TIME | COORDINATE VALUES AND DIRECTIONS ON ROUTE IN TRAVEL AREA | CLEANING CONDITIONS

FIG. 23

AUTONOMOUS TRAVEL ROUTE PLANNING METHOD, AUTONOMOUS TRAVELING METHOD, AND PROGRAM

BACKGROUND OF THE INVENTION

1. Field of the Invention

The present invention relates to an autonomous travel route planning method for an autonomous traveling body. In particular, the present invention relates to a method for planning an autonomous travel route for an autonomous traveling body to autonomously travel to fill in a travel area set in a movement environment and to travel while avoiding obstacles existing in the travel area, a method for causing the autonomous traveling body to autonomously travel the planned autonomous travel route, and a non-transitory computer-readable medium including a program that causes a computer to execute these methods.

2. Description of the Related Art

Conventionally, there is known an autonomous traveling body that can autonomously travel a travel route (referred to as a filling travel route) to fill in a travel area set in a movement environment (see, for example, PCT Publication No. 2018/043180).

The filling travel route is created by setting a travel area on an environmental map indicating the movement environment, and by planning a travel route in which straight paths and turning paths are combined in the travel area.

SUMMARY OF THE INVENTION

In the movement environment, there may be an obstacle that the autonomous traveling body has to avoid. Further, the environmental map is used for the autonomous traveling body to perform position estimation, and hence it is preferred that the environmental map includes information about obstacles. It is because the position estimation can be performed more precisely if the environmental map includes map information of characteristic shapes due to obstacles.

In a conventional method for creating a filling travel route, if information about an obstacle in the environmental map is also included in the travel area, the filling travel route is created to avoid the obstacle. On the other hand, an obstacle that exists when the environmental map is created may not exist when the autonomous traveling body performs autonomous travel, and in the conventional method, the filling travel route is created to avoid the obstacle.

In this case, the autonomous traveling body cannot perform the autonomous travel to appropriately fill in the travel area. This is because if an obstacle that exists when the environmental map is created will not exist when the autonomous travel is performed, and if the autonomous travel is performed according to the filling travel route created by the conventional method, the autonomous traveling body will travel while avoiding a place where no obstacle exists, and hence there will occur an "unfilled place" where the autonomous traveling body does not travel in the travel area.

Preferred embodiments of the present invention provide autonomous travel route planning methods for creating a filling travel route that makes it possible to appropriately fill in a travel area, even if an obstacle that exists when an environmental map is created will not exist when an autonomous traveling body performs autonomous travel.

Hereinafter, a plurality of preferred embodiments are described. These preferred embodiments can be arbitrarily combined as necessary.

An autonomous travel route planning method according to an aspect of a preferred embodiment of the present invention is a method for planning an autonomous travel route for an autonomous traveling body to autonomously travel to fill in a travel area set in a movement environment and to travel while avoiding an obstacle that exists in the travel area.

The autonomous travel route planning method includes creating a first map including obstacle information indicating an obstacle that exists in the movement environment, setting an outer peripheral boundary corresponding to an outer periphery of the travel area by associating the outer periphery boundary with the first map, creating a second map in which obstacle information existing inside the outer peripheral boundary is deleted, as a map independent from the first map, creating a filling travel route to fill in the travel area included in the second map, and in a case where the autonomous traveling body autonomously travels along the filling travel route, estimating a position of the autonomous traveling body based on the first map.

In the autonomous travel route planning method described above, the second map in which obstacle information about an obstacle included in the travel area is deleted is created independently from the first map, and next the filling travel route is created in the travel area included in the second map.

In this way, even if an obstacle that exists in the travel area when the first map is created will not exist when the autonomous travel is performed, it is possible to create the filling travel route that makes it possible to appropriately fill in the travel area.

In creating the second map, all the obstacle information existing inside the outer peripheral boundary may be deleted. In this way, the second map can be easily created.

In creating the second map, obstacle information that matches a predetermined condition among the obstacle information existing inside the outer peripheral boundary may be deleted.

In this way, a more appropriate filling travel route can be created in the second map, by deleting the obstacle information that is predicted to cause creation of an inappropriate filling travel route if it exists.

The obstacle information that matches a predetermined condition may be information indicating an obstacle having a predetermined size or smaller among obstacle information existing inside the outer peripheral boundary.

In this way, based on a prediction that a small obstacle tends to move and will not exist when the autonomous travel is performed, a more appropriate filling travel route can be created in the second map by deleting the obstacle information.

The obstacle information that matches a predetermined condition may be information indicating a moving obstacle among obstacle information existing inside the outer peripheral boundary.

In this way, a more appropriate filling travel route can be created in the second map, by deleting obstacle information that is predicted not to exist when the autonomous travel is performed.

The autonomous travel route planning method described above may further include virtually causing the autonomous traveling body to detect an obstacle, while virtually causing the autonomous traveling body to travel along the filling travel route in the first map, and determining whether or not the autonomous traveling body can perform position estimation during traveling along the filling travel route, based on the virtual obstacle detection status.

In this way, it is possible to predict, before the autonomous travel is performed, whether or not the autonomous traveling body can perform the position estimation using the first map and the obstacle information in the autonomous travel, when it autonomously travels the filling travel route.

In determining whether or not the autonomous traveling body can perform the position estimation, it may be possible to determine that the autonomous traveling body cannot perform the position estimation in a case where an obstacle is not detected in virtually causing to detect an obstacle.

In this way, it is possible to predict, before the autonomous travel is performed, that an obstacle is not detected when autonomously traveling along the filling travel route, and that position estimation using the first map and the obstacle information in the autonomous travel will be unable to be performed.

In determining whether or not the autonomous traveling body can perform the position estimation, it may be possible to determine that the autonomous traveling body cannot perform the position estimation, in a case where the obstacle detected in virtually causing to detect an obstacle has a simple shape.

In this way, it is possible to predict, before the autonomous travel is performed, that only a simple shape obstacle is detected when autonomously traveling along the filling travel route, and that the position estimation using the first map and the obstacle information in the autonomous travel will be unable to be performed or accuracy of the position estimation will be possibly deteriorated.

In determining whether or not the autonomous traveling body can perform the position estimation, it may be possible to determine that the autonomous traveling body cannot perform the position estimation, in a case where an obstacle is not detected in virtually causing to detect an obstacle, or in a case where the detected obstacle has a simple shape for a predetermined period of time or longer.

In this way, it is possible to predict, before the autonomous travel is performed, that the position estimation will be unable to be performed when the autonomous travel is performed.

The setting the outer peripheral boundary may include causing the autonomous traveling body to move along the outer periphery of the travel area, estimating passing points that are passed during movement along the outer periphery of the travel area, and setting a set of the passing points as the outer peripheral boundary.

In this way, the travel area can be set by manually operating the autonomous traveling body.

The setting the outer peripheral boundary may include drawing a boundary line corresponding to the outer peripheral boundary in the first map.

In this way, the travel area can be set without operating the autonomous traveling body to travel along the outer periphery of the travel area.

An autonomous traveling method according to another aspect of a preferred embodiment of the present invention is a method performed by an autonomous traveling body to autonomously travel to fill in a travel area set in a movement environment.

The autonomous traveling method includes creating a first map including obstacle information indicating an obstacle that exists in the movement environment, setting an outer peripheral boundary corresponding to an outer periphery of the travel area by associating the other peripheral boundary with the first map, creating a second map in which obstacle information existing inside the outer peripheral boundary is deleted as a map independent from the first map, creating a filling travel route to fill in the travel area included in the second map, determining a current position of the autonomous traveling body, determining whether or not an obstacle exists in an interference region on a future travel route from the determined current position to a target position on the filling travel route, and causing the autonomous traveling body to travel along the future travel route in a case where no obstacle exists in the interference region, while causing the autonomous traveling body to travel along an avoidance route planned to avoid the obstacle in a case where an obstacle exists in the interference region.

In the autonomous traveling method described above, the second map in which obstacle information about an obstacle included in the travel area is deleted is created independently from the first map, and next the filling travel route is created in the travel area included in the second map. In this way, even if an obstacle that exists in the travel area when the first map is created will not exist when the autonomous travel is performed, it is possible to create the filling travel route that makes it possible to appropriately fill in the travel area.

In addition, when the autonomous travel is performed, it is determined whether or not an obstacle exists in the interference region on the future travel route from the determined current position to a target position on the filling travel route. If no obstacle exists in the interference region, the autonomous traveling body is allowed to travel the future travel route described above. In contrast, if an obstacle exists in the interference region, the autonomous traveling body is allowed to travel the avoidance route planned to avoid the obstacle. In this way, even if the filling travel route is created without considering existence of an obstacle, the autonomous traveling body can autonomously travel according to the created filling travel route while avoiding the obstacle that exists when an autonomous travel mode is executed.

A non-transitory computer-readable medium including a program according to still another aspect of a preferred embodiment of the present invention causes a computer to perform the autonomous travel route planning method or the autonomous traveling method described above.

In the autonomous travel route planning methods according to preferred embodiments of the present invention, it is possible to create a filling travel route that makes it possible to appropriately fill in the travel area, even if an obstacle that exists when an environmental map is created will not exist when the autonomous traveling body performs the autonomous travel.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 23 is a diagram illustrating an example of the traveling schedule.

DETAILED DESCRIPTION OF THE PREFERRED EMBODIMENTS

First Preferred Embodiment

Figure 1:
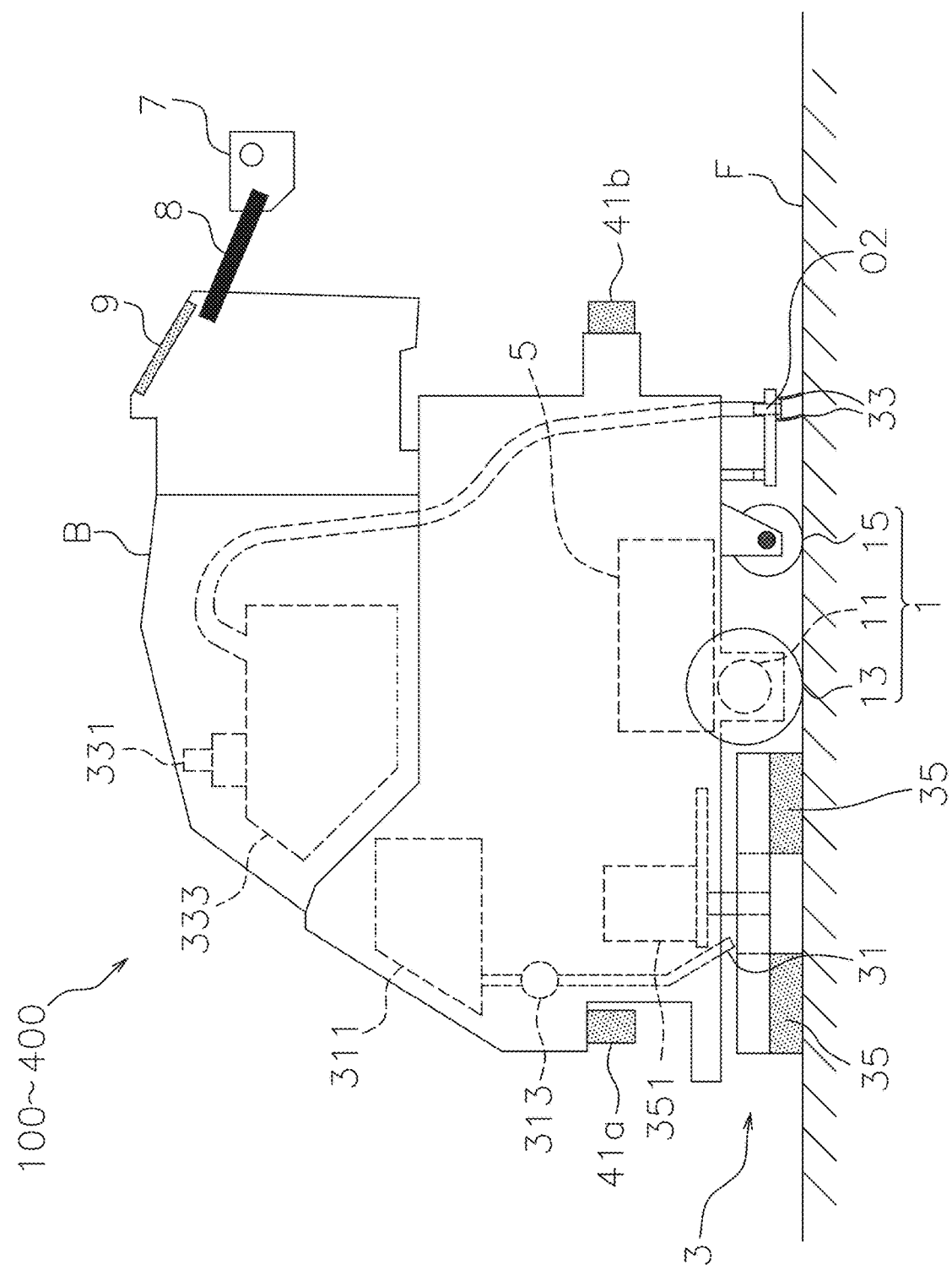
FIG. 1 is a diagram illustrating an overall structure of an example of an autonomous traveling device.

With reference to FIG. 1, an overall structure of an autonomous traveling device 100 (an example of an autonomous traveling body) according to a first preferred embodiment is described. FIG. 1 is a diagram illustrating an overall structure of an example of the autonomous traveling device. The autonomous traveling device 100 is a cleaning machine that autonomously reproduces set cleaning conditions and travel route.

The autonomous traveling device 100 includes a traveling unit 1. The traveling unit 1 is a device that is configured to cause the autonomous traveling device 100 to travel. The traveling unit 1 includes a main body B that is a main body of the autonomous traveling device 100. The traveling unit 1 includes, at each of left and right ends of a bottom of the main body B, a travel motor 11 and a main wheel 13 that is connected to an output rotation shaft of the travel motor 11 and is rotated along with rotation of the travel motor 11.

The autonomous traveling device 100 includes a cleaning unit 3. The cleaning unit 3 is a device placed at the bottom of the main body B so as to clean a floor surface F according to designated cleaning conditions. The cleaning unit 3 of this preferred embodiment includes a washing liquid discharge port 31, a squeegee 33, and a cleaning member 35.

The washing liquid discharge port 31 discharges washing liquid (such as water) to the floor surface F in front of the main body B. The washing liquid is supplied from a washing liquid supply tank 311 by a washing liquid supply pump 313. The squeegee 33 is placed on the rear side of the bottom of the main body B so as to collect the washing liquid remaining on the floor surface F. The cleaning member 35 is placed on the front side of the bottom of the main body B and is rotated when a cleaning member rotation motor 351 rotates. The cleaning member 35 rotates on the floor surface F with the washing liquid so as to clean the floor surface F.

As the cleaning unit 3 described above is provided, the autonomous traveling device 100 can perform a cleaning operation for polishing the floor surface F using the washing liquid.

In another preferred embodiment, the squeegee 33 may be provided with a suction opening 33a. The suction opening 33a sucks the washing liquid, dust, and the like collected by the squeegee 33. The suction opening 33a is connected to a collecting member 333. A negative pressure can be generated in the collecting member 333 by a suction motor 331. When the collecting member 333 is in the negative pressure state, the washing liquid, dust, and the like collected by the squeegee 33 are sucked through the suction opening 33a and conveyed to the collecting member 333.

The autonomous traveling device 100 includes a control unit 5 (an example of a route planning device). The control unit 5 is a computer system including a CPU, a storage device (such as a RAM, a ROM, a hard disk drive, or an SSD), and various interfaces. The control unit 5 performs various controls related to the autonomous traveling device 100 (described later).

The autonomous traveling device 100 includes a travel route teaching unit 7. The travel route teaching unit 7 is a device that is configured to accept moving operations by an operator of the traveling unit 1. The travel route teaching unit 7 is attached to the upper rear side of the main body B via an attachment member 8. In this way, the operator can operate the travel route teaching unit 7 so as to perform the moving operation of the traveling unit 1 (described later).

As another preferred embodiment, the travel route teaching unit 7 may not be attached to the main body B. In this case, the travel route teaching unit 7 is a controller such as a joy stick. In this way, the operator can remotely control the autonomous traveling device 100.

The autonomous traveling device 100 includes a setting unit 9. The setting unit 9 is a console that is configured to make various settings related to the autonomous traveling device 100. The setting unit 9 is attached to an upper rear surface of the main body B. In addition, the setting unit 9 is placed near the travel route teaching unit 7. In this way, the operator can operate the setting unit 9 while operating the travel route teaching unit 7 so as to operate the traveling unit 1.

As another preferred embodiment, the setting unit 9 may not be attached to the main body B. In this case, the setting unit 9 can be a console such as a portable terminal capable of wireless communication. In this way, the operator can remotely set the autonomous traveling device 100.

Figure 2:
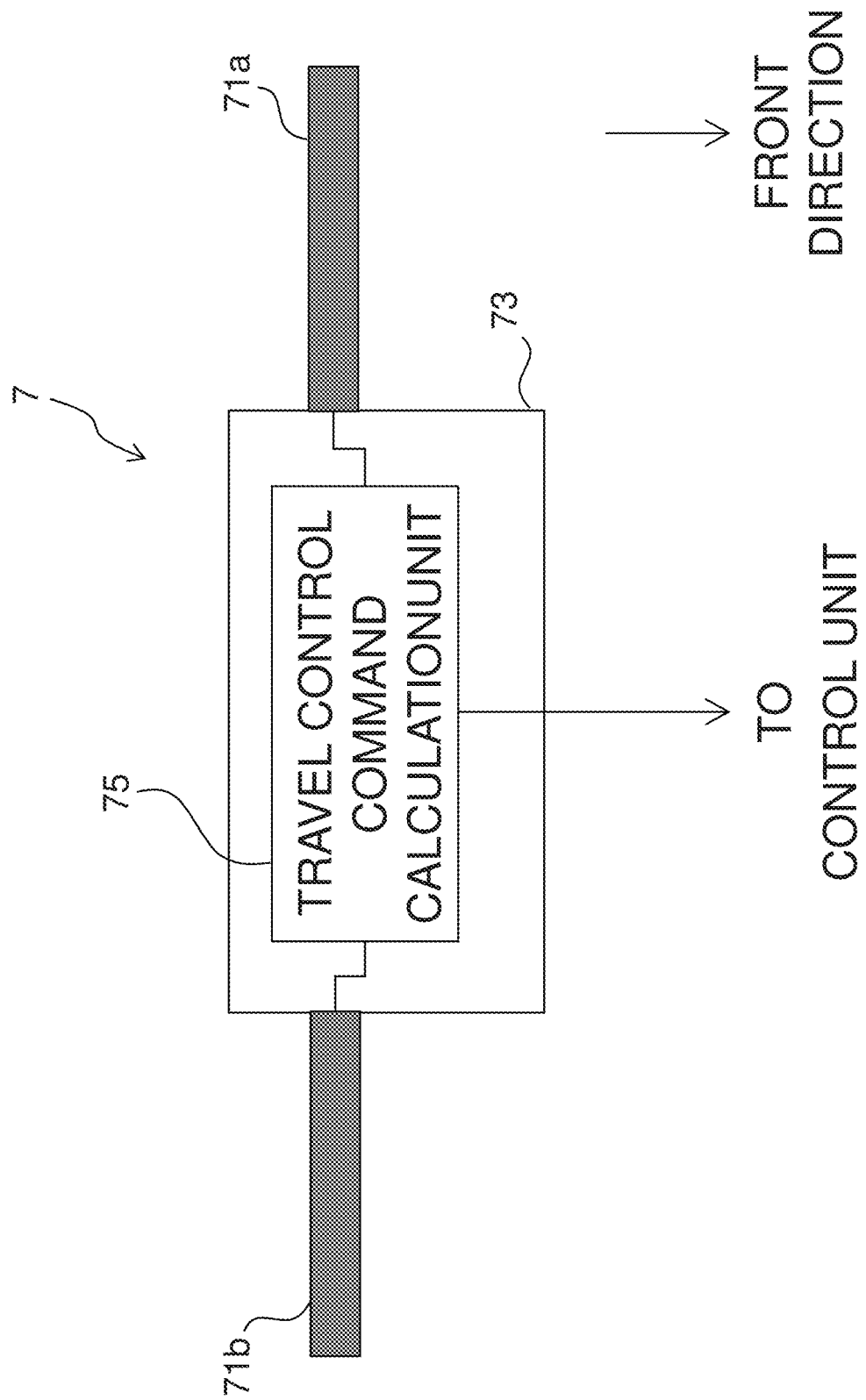
FIG. 2 is a diagram illustrating an example of a structure of a travel route teaching unit.

With reference to FIG. 2, an example of a structure of the travel route teaching unit 7 is described. FIG. 2 is a diagram illustrating an example of a structure of the travel route teaching unit.

The travel route teaching unit 7 includes handles 71a and 71b. The handles 71a and 71b are fixed to the right and left sides of a case 73, respectively. The handles 71a and 71b are used when the operator operates the autonomous traveling device 100.

For instance, the operator who grips the handles 71a and 71b can apply a force to the autonomous traveling device 100 to pull it to the operator or push it via the handles 71a and 71b. By adjusting forces applied respectively to the handles 71a and 71b, the operator can adjust traveling direction of the autonomous traveling device 100. For instance, when applying a force to the right side handle 71a viewed from front of the autonomous traveling device 100 so as to pull the autonomous traveling device 100, the autonomous traveling device 100 turns left.

The handles 71a and 71b are mounted to the case 73 in a rotatable manner. In addition, the handles 71a and 71b are connected to the control unit 5 via a travel control command calculation unit 75. The travel control command calculation unit 75 converts rotations of the handles 71a and 71b into electric signals and outputs them to the control unit 5. In this way, the operator can control the autonomous traveling device 100 (traveling unit 1) by rotation operations of the handles 71a and 71b.

For instance, the operator may be able to switch between forward and backward movements of the autonomous traveling device 100 by adjusting rotation directions of the handles 71a and 71b. In addition, by adjusting amounts of rotation of the handles 71a and 71b, it may be possible to adjust the driving speed of the autonomous traveling device 100. Furthermore, by differentiating amounts of rotation of the handles 71a and 71b, it may be possible to change driving direction of the autonomous traveling device 100.

Figure 3:
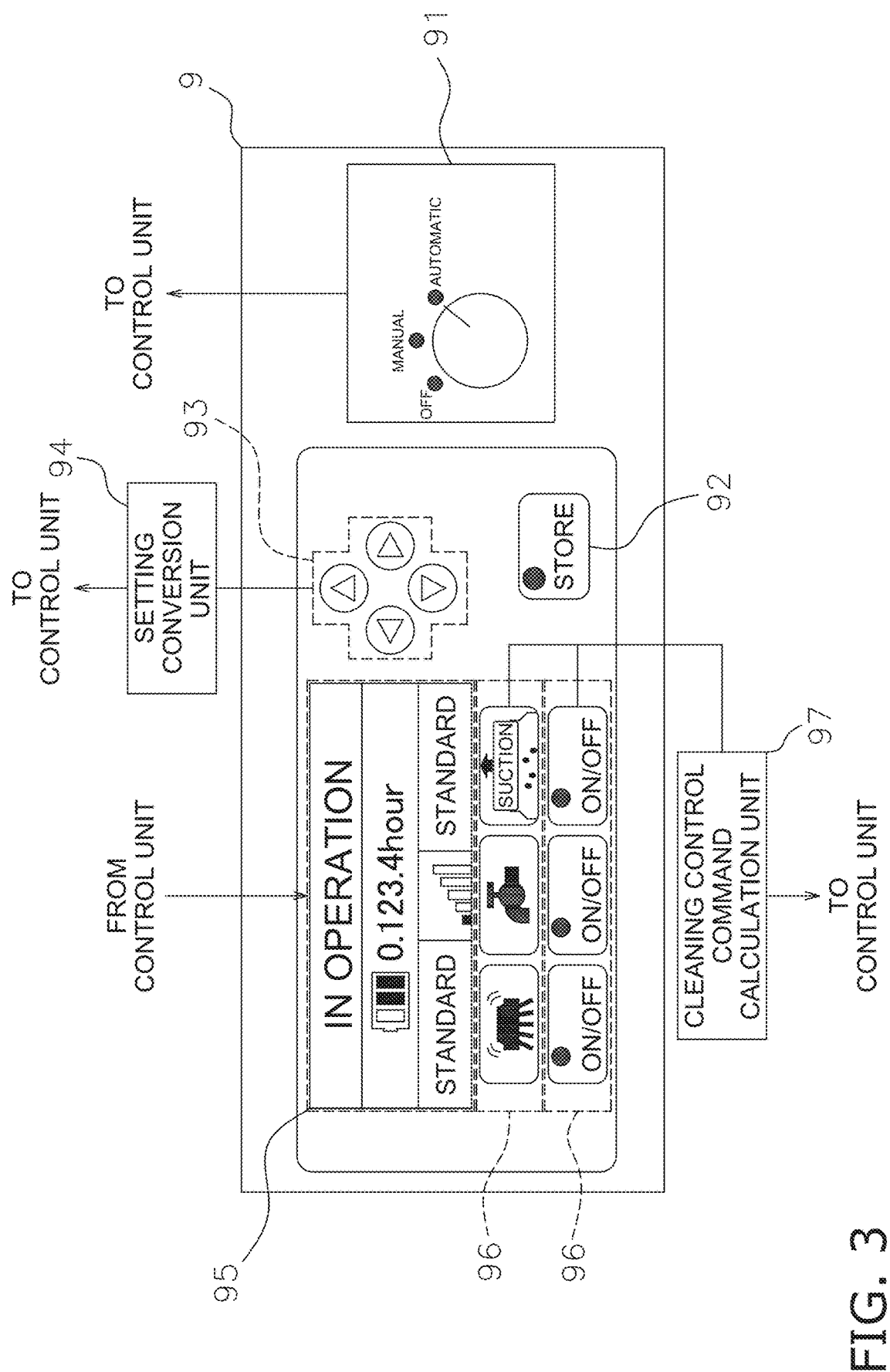
FIG. 3 is a diagram illustrating an example of a structure of a setting unit.

With reference to FIG. 3, a structure of the setting unit 9 is described. FIG. 3 is a diagram illustrating an example of a structure of the setting unit.

The setting unit 9 includes a switching unit 91. The switching unit 91 selects an operation mode of the autonomous traveling device 100 and outputs the selected mode to the control unit 5. The operation modes of the autonomous traveling device 100 include an autonomous travel mode and a manual operation mode. The autonomous travel mode is an operation mode in which the autonomous traveling device 100 autonomously travels and cleans the floor surface F. The manual operation mode is an operation mode in which the autonomous traveling device 100 can be manually operated by the operator.

The switching unit 91 can be a selector switch as illustrated in FIG. 3, for example.

The setting unit 9 includes a manual operation memory switch 92. The manual operation memory switch 92 is a switch for the operator to start or stop storing the manual operation of the autonomous traveling device 100.

Specifically, when the manual operation memory switch 92 is pressed after the operation mode is set to the manual operation mode with the switching unit 91, storing of cleaning conditions and travel route of the manual operation performed by the operator is started. In other words, teaching of cleaning conditions and travel route is started. On the other hand, when the manual operation memory switch 92 is pressed during storing of cleaning conditions and travel route of the manual operation, the storing of cleaning conditions and travel route is stopped.

It should be noted that the operation mode for storing (teaching) cleaning conditions and travel route of the manual operation by the operator is referred to as a manual operation teaching mode. The manual operation teaching mode is started as a sub operation mode of the manual operation mode.

The manual operation memory switch 92 may be a push button switch as illustrated in FIG. 3, for example. In this case, switching of the manual operation memory switch 92 is made by pressing the push button switch.

The setting unit 9 includes a setting operation unit 93. The setting operation unit 93 may be a push switch or the like, for example. The setting operation unit 93 accepts various setting inputs related to the autonomous traveling device 100.

A setting conversion unit 94 converts the input accepted by the setting operation unit 93 into a signal that the control unit 5 can decode. The setting conversion unit 94 is a signal conversion circuit or a computer system that can perform signal conversion.

The setting unit 9 includes a display 95. The display 95 displays various setting information related to the autonomous traveling device 100, which are currently set. The display 95 is, for example, a liquid crystal display, an organic EL display, or other display.

In another preferred embodiment, the display 95 may further display a current operation mode (the autonomous travel mode, the manual operation mode, or the manual operation teaching mode), operation hours, remaining battery capacity for driving the autonomous traveling device 100, and the like.

In another preferred embodiment, the display 95 may be provided with a touch panel. In this case, the switching unit 91, the manual operation memory switch 92, and/or the setting operation unit 93 may be realized by the touch panel.

The setting unit 9 may include a cleaning condition teaching unit 96. The cleaning condition teaching unit 96 accepts an input of cleaning conditions from the operator. A cleaning control command calculation unit 97 converts the cleaning conditions accepted by the cleaning condition teaching unit 96 into a signal that the control unit 5 can decode, and outputs the signal to the control unit 5. The cleaning control command calculation unit 97 is a signal conversion circuit or a computer system that can perform signal conversion.

Figure 4:
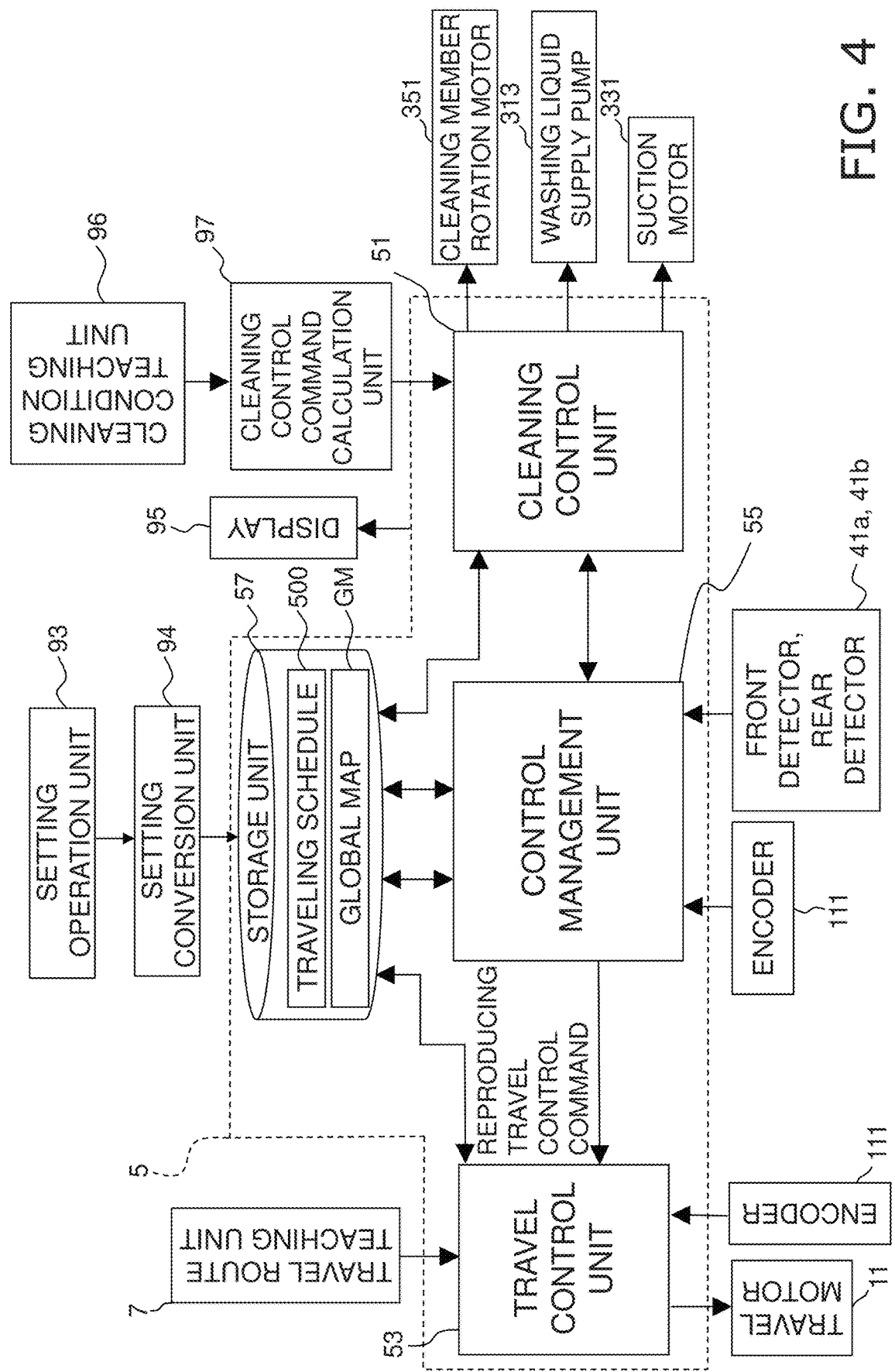
FIG. 4 is a diagram illustrating a functional block structure of the entire control unit.

With reference to FIG. 4, a functional block structure of the entire control unit 5 is described. FIG. 4 is a diagram illustrating a functional block structure of the entire control unit. All or a portion of the functional blocks of the control unit 5 described below may be realized by a program that a computer system of the control unit 5 can perform. In this case, the program may be stored in a memory unit and/or the storage device. All or a portion of individual functional blocks of the control unit 5 may be realized as a custom IC such as a system on chip (SoC).

The control unit 5 may be a single computer system or a plurality of computer systems. If a plurality of computer systems are included in the control unit 5, for example, functions realized by the plurality of functional blocks of the control unit 5 can be assigned to the plurality of computer systems to execute at arbitrary ratios.

The control unit 5 includes a cleaning control unit 51. The cleaning control unit 51 supplies powers for controlling rotation speeds, outputs, or the like to the cleaning member rotation motor 351, the washing liquid supply pump 313, and the suction motor 331.

In the example in which the setting unit 9 includes the cleaning condition teaching unit 96, the cleaning control unit 51 may input taught cleaning conditions from the cleaning condition teaching unit 96 via the cleaning control command calculation unit 97, and may control the cleaning member rotation motor 351, the washing liquid supply pump 313, and the suction motor 331, based on the taught cleaning condition.

In another preferred embodiment, the cleaning control unit 51 may input reproducing cleaning conditions from a control management unit 55 when the autonomous travel mode is executed. The reproducing cleaning conditions are set values of cleaning conditions in the autonomous travel mode. In this case, the cleaning control unit 51 may control the cleaning unit 3 based on the reproducing cleaning conditions that are input.

The control unit 5 includes a travel control unit 53. The travel control unit 53 controls the travel motor 11 based on a travel control command. The travel control command is a command based on amounts of rotation and rotation directions of the handles 71a and 71b input from the travel route teaching unit 7. Alternatively, the travel control command is a command input from the control management unit 55.

In addition, the travel control unit 53 calculates a rotation speed of the travel motor 11 based on a pulse signal output from an encoder 111 mounted to the output rotation shaft of the travel motor 11.

The control unit 5 includes the control management unit 55. The control management unit 55 manages travel of the autonomous traveling device 100. Specifically, based on information obtained by a front detector 41a, a rear detector 41b, and/or the encoder 111, the control management unit 55 calculates position information indicating a position on the floor surface F at which the autonomous traveling device 100 is moving.

The control management unit 55 creates a traveling schedule 500 using the above-mentioned position information when the manual operation teaching mode is executed. In another preferred embodiment, the control management unit 55 may calculate cleaning conditions in the autonomous travel mode and may associate them with the traveling schedule 500.

On the other hand, when the autonomous travel mode is executed, the control management unit 55 calculates a reproducing travel control command based on data stored in the traveling schedule 500. The calculated reproducing travel control command is output to the travel control unit 53. In this way, when the autonomous travel mode is executed, the travel control unit 53 controls the travel motor 11 based on the reproducing travel control command, so that the autonomous traveling device 100 can autonomously move.

In the preferred embodiment in which the cleaning conditions are associated with the traveling schedule 500, when the autonomous travel mode is executed, the control management unit 55 may control the cleaning control unit 51 based on the cleaning conditions stored in the traveling schedule 500. In this way, while the autonomous traveling device 100 is autonomously traveling according to the traveling schedule 500, it can autonomously perform the cleaning operation according to the cleaning conditions.

The control unit 5 includes a storage unit 57. The storage unit 57 is a portion of or an entirety of the storage device of the computer system defining the control unit 5. The storage unit 57 stores various information related to the autonomous traveling device 100. Specifically, the storage unit 57 stores the traveling schedule 500 created by the control management unit 55, and various settings related to the autonomous traveling device 100 input from the setting operation unit 93 or the setting conversion unit 94.

The travel control unit 53 and the control management unit 55 can read out various settings related to the autonomous traveling device 100 and/or the traveling schedule 500 stored in the storage unit 57, as necessary, and can perform various adjustments and controls based on them.

In another preferred embodiment, the control unit 5 may include a data writing device (not shown) for storing information such as the traveling schedule 500 stored in the storage unit 57, in another storage medium.

Figure 5:
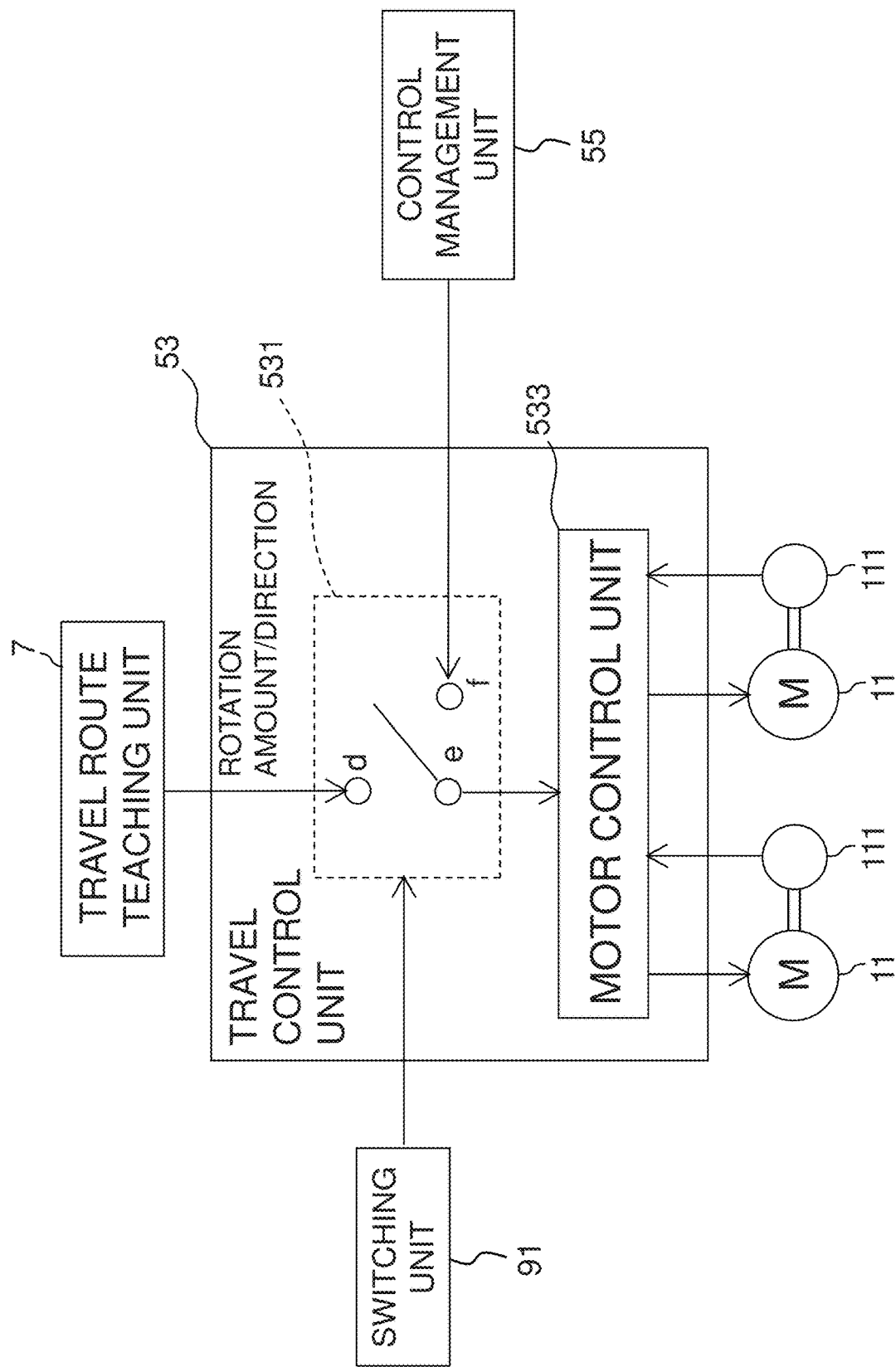
FIG. 5 is a diagram illustrating a detailed structure of functional blocks of a travel control unit.

With reference to FIG. 5, a functional block structure of the travel control unit 53 is described in detail. FIG. 5 is a diagram illustrating a detailed structure of functional blocks of the travel control unit.

The travel control unit 53 includes a travel switching unit 531. The travel switching unit 531 has three terminals d, e, and f. The terminal d is connected to the travel route teaching unit 7, the terminal e is connected to a motor control unit 533, and the terminal f is connected to the control management unit 55.

The travel switching unit 531 selects a connection between the terminal e and the terminal d, or a connection between the terminal e and the terminal f, based on the operation mode selected by the switching unit 91.

Specifically, if the manual operation mode is selected by the switching unit 91, the travel switching unit 531 connects the terminal e and the terminal d. In this way, the travel switching unit 531 can connect the travel route teaching unit 7 to the motor control unit 533. In other words, when the manual operation mode or the manual operation teaching mode is executed, the travel switching unit 531 can send to the motor control unit 533 signals indicating amounts of rotation and/or rotation directions of the handles 71a and 71b.

In contrast, if the autonomous travel mode is selected by the switching unit 91, the travel switching unit 531 connects the terminal e and the terminal f. In this way, the travel switching unit 531 can connect the control management unit 55 to the motor control unit 533. In other words, when the autonomous travel mode is executed, the travel switching unit 531 can send to the motor control unit 533 the reproducing travel control command output from the control management unit 55.

The motor control unit 533 calculates target rotation speed of the travel motor 11 based on the input amounts of rotation and rotation directions of the handles 71a and 71b, or the reproducing travel control command. The motor control unit 533 outputs to the travel motor 11 a drive power for rotating the travel motor 11 at the target rotation speed.

The motor control unit 533 calculates an actual rotation speed of the travel motor 11 based on the pulse signal from the encoder 111, and calculates the drive power to be output to the travel motor 11. For instance, the motor control unit 533 uses a proportional integral (PI) control theory, a proportional integral differential (PID) control theory, or the like, so as to control the travel motor 11.

In this preferred embodiment, the travel motor 11 and the main wheel 13 are placed at each of the left and right ends of the bottom of the main body B. In this case, the motor control unit 533 controls rotation speeds and rotation directions of the left and right travel motors 11 independently, so as to determine driving direction of the autonomous traveling device 100.

Figure 6:
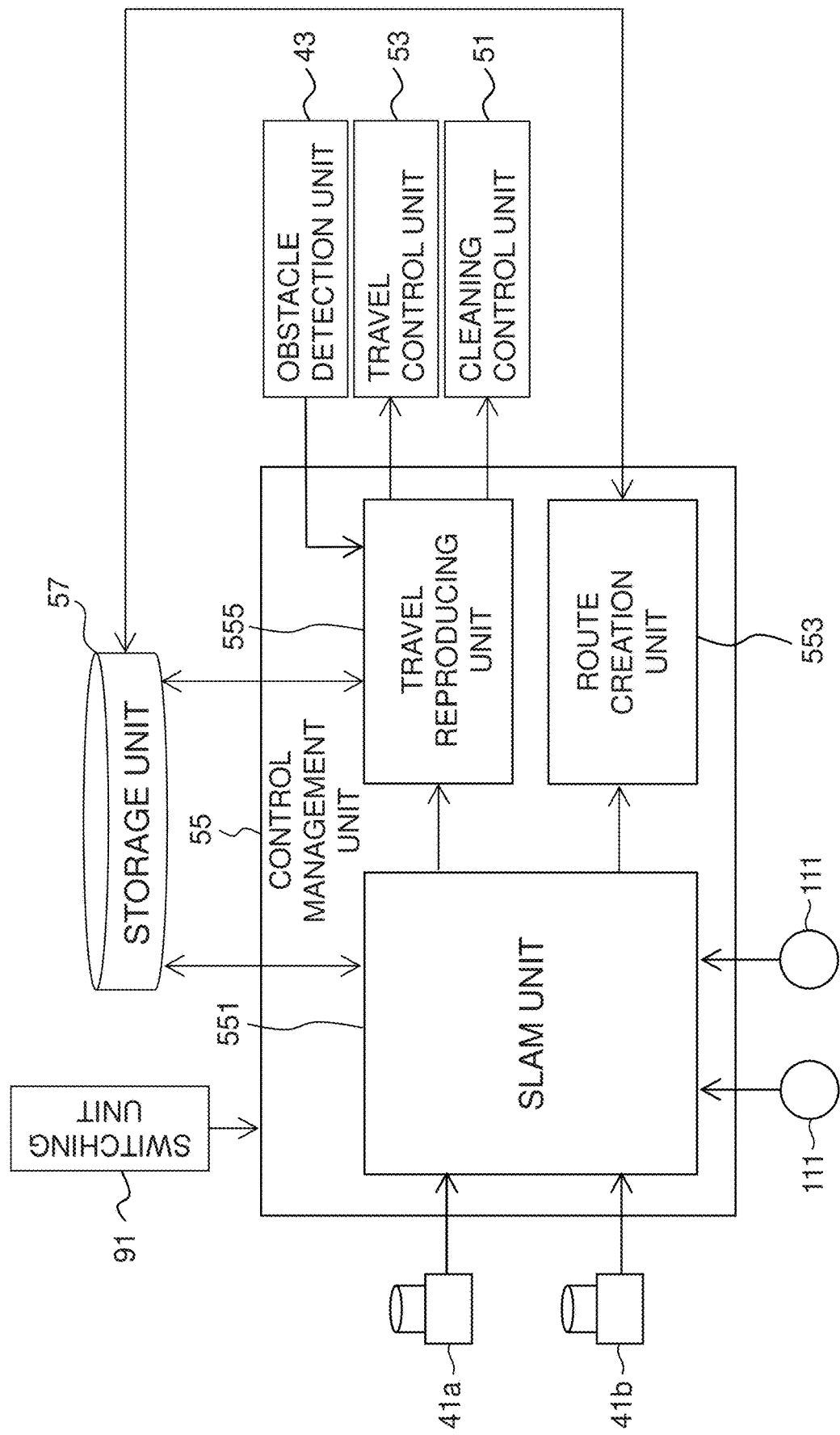
FIG. 6 is a diagram illustrating a detailed structure of functional blocks of a control management unit.

With reference to FIG. 6, a functional block structure of the control management unit 55 is described in detail. FIG. 6 is a diagram illustrating a detailed structure of the functional block of the control management unit.

The control management unit 55 includes an SLAM unit 551. The SLAM unit 551 creates a local map and a global map GM (an example of a first map) using information about obstacles in front of the autonomous traveling device 100 and information about obstacles in rear of the autonomous traveling device 100.

The local map is map information indicating positions of obstacles around the autonomous traveling device 100, and is created by coordinate conversion, as necessary, of information about obstacles obtained by the front detector 41*a* and the rear detector 41*b*.

On the other hand, the global map GM is map information indicating positions of obstacles existing in a movement environment EV, and is created by linking local maps obtained by moving the autonomous traveling device 100 in the movement environment EV, in this preferred embodiment.

It should be noted that the information about obstacles in front of the autonomous traveling device 100 is obtained by using the front detector 41*a* (FIG. 1). The information about obstacles in rear of the autonomous traveling device 100 is obtained by using the rear detector 41*b* (FIG. 1).

The front detector 41*a* and the rear detector 41*b* are laser range finders (LRFs) having a detection range of 180 degrees or more, for example. When using laser range finders as the front detector 41*a* and the rear detector 41*b*, the distance between the traveling unit 1 and the obstacle, and the direction to the obstacle can be obtained as the information about the obstacle.

The information obtained by the front detector 41*a* and the rear detector 41*b* may be two-dimensional information indicating the position of the obstacle on a predetermined plane, or may be three-dimensional information further including the height position of the obstacle.

The SLAM unit 551 estimates a position of the autonomous traveling device 100 on predetermined coordinates, based on the local map, the global map GM, and amount of rotation of the travel motor 11. The amount of rotation of the travel motor 11 is obtained by the encoder 111. Specifically, the SLAM unit 551 performs the position estimation as follows.

First, the SLAM unit 551 performs position estimation by dead reckoning based on the amount of rotation of the travel motor 11 from the last position estimation to the present. Next, the SLAM unit 551 determines a plurality of position candidates at the position estimated by dead reckoning and around it.

After that, the SLAM unit 551 puts a current local map at each of the plurality of position candidates on the global map GM, and calculates a degree of matching between the current local map positioned at each position candidate and the global map GM. The SLAM unit 551 estimates that the current position is one of the position candidates, which has the maximum degree of matching between the current local map and the global map GM.

The control management unit 55 includes a route creation unit 553. The route creation unit 553 creates the traveling schedule 500, and stores it in the storage unit 57. The traveling schedule 500 indicates the route along which the autonomous traveling device 100 autonomously travels. In this preferred embodiment, the traveling schedule 500 indicates the route along which the autonomous traveling device 100 autonomously travels thoroughly (to fill in) a travel area TA set in the movement environment EV (global map GM).

The control management unit 55 includes a travel reproducing unit 555. When the travel reproducing unit 555 executes the autonomous travel mode, it calculates a control command (the reproducing travel control command) based on the information stored in the traveling schedule 500 and the estimated position information obtained from the SLAM unit 551. This control command enables the autonomous traveling device 100 to autonomously travel along the travel route indicated in the traveling schedule 500. The travel reproducing unit 555 outputs the calculated reproducing travel control command to the travel control unit 53.

In another preferred embodiment, the travel reproducing unit 555 may output to the cleaning control unit 51 the cleaning conditions associated with the traveling schedule 500.

In addition, the travel reproducing unit 555 is connected to an obstacle detection unit 43. The obstacle detection unit 43 detects obstacles existing in the driving direction of the autonomous traveling device 100. The obstacle detection unit 43 is an ultrasonic sensor placed on the front of the main body B, for example. Other than that, the front detector 41*a* may be used as a sensor that detects obstacles in the driving direction.

If an obstacle is detected in the driving direction of the autonomous traveling device 100 during executing the autonomous travel mode, the travel reproducing unit 555 calculates the reproducing travel control command to avoid the obstacle, and outputs the reproducing travel control command to the travel control unit 53. In this way, even if the traveling schedule 500 is created without considering existence of obstacles, the autonomous traveling device 100 can autonomously travel while avoiding the detected obstacle.

Hereinafter, operations of the autonomous traveling device 100 are described. The operations of the autonomous traveling device 100 described below are realized by executing the computer program stored in the storage device of the control unit 5.

Figure 7:
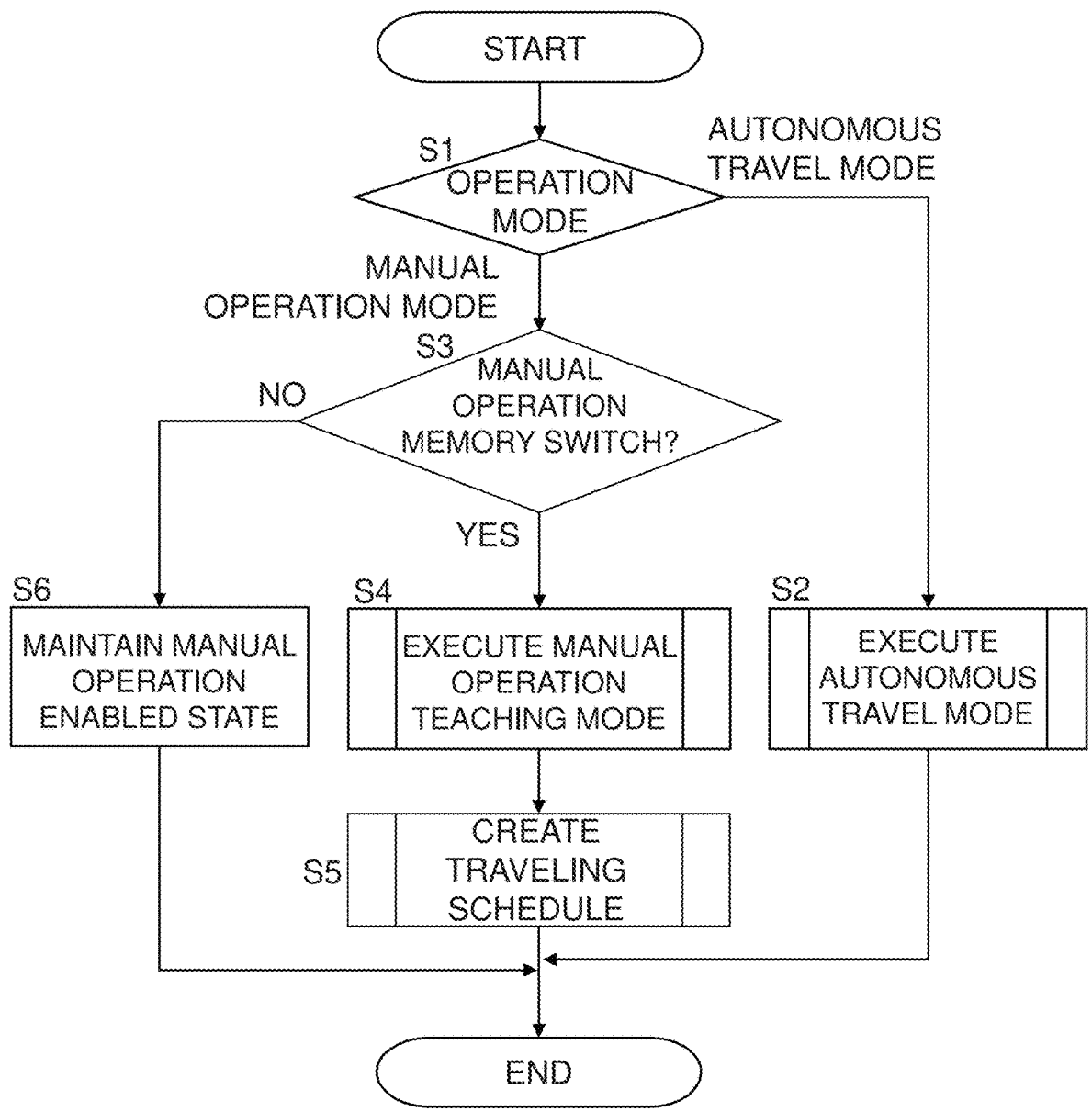
FIG. 7 is a flowchart showing basic operations of the autonomous traveling device.

First, with reference to FIG. 7, basic operations of the autonomous traveling device 100 are described. FIG. 7 is a flowchart showing basic operations of the autonomous traveling device.

When the autonomous traveling device 100 starts the operation, the control unit 5 checks a status of the switching unit 91 (Step S1). If the switching unit 91 selects "automatic" (in the case of "autonomous travel mode" in Step S1), the autonomous travel mode is executed (Step S2). In other words, the autonomous traveling device 100 autonomously travels (performs cleaning operation) according to the traveling schedule 500 stored in the storage unit 57.

On the other hand, if the switching unit 91 selects "manual" (in the case of "manual operation mode" in Step S1), the control unit 5 determines that the operation mode to be executed is the manual operation mode.

During executing the manual operation mode, if it is detected that the manual operation memory switch 92 is pressed ("Yes" in Step S3), the control unit 5 changes the operation mode to the manual operation teaching mode (Step S4). As a result, operations of the autonomous traveling device 100 by the operator after the manual operation memory switch 92 is pressed are stored.

In Step S4 described above, during executing the manual operation teaching mode, the control unit 5 monitors whether or not the manual operation memory switch 92 is pressed. If the manual operation memory switch 92 is pressed during executing the manual operation teaching mode, the control unit 5 finishes the manual operation teaching mode at that timing. After that, in Step S5 the route creation unit 553 creates the traveling schedule 500 using the data taught in the manual operation teaching mode.

On the other hand, if the manual operation memory switch 92 is not pressed after changing to the manual operation mode ("No" in Step S3), the control unit 5 maintains the manual operation mode in which operations by the operator are not stored, in Step S6.

As described above, the autonomous traveling device 100 according to this preferred embodiment can execute the autonomous travel mode, the manual operation mode, or the manual operation teaching mode, according to the selection of the operation mode with the switching unit 91, and whether or not the manual operation memory switch 92 is pressed.

Figure 8:
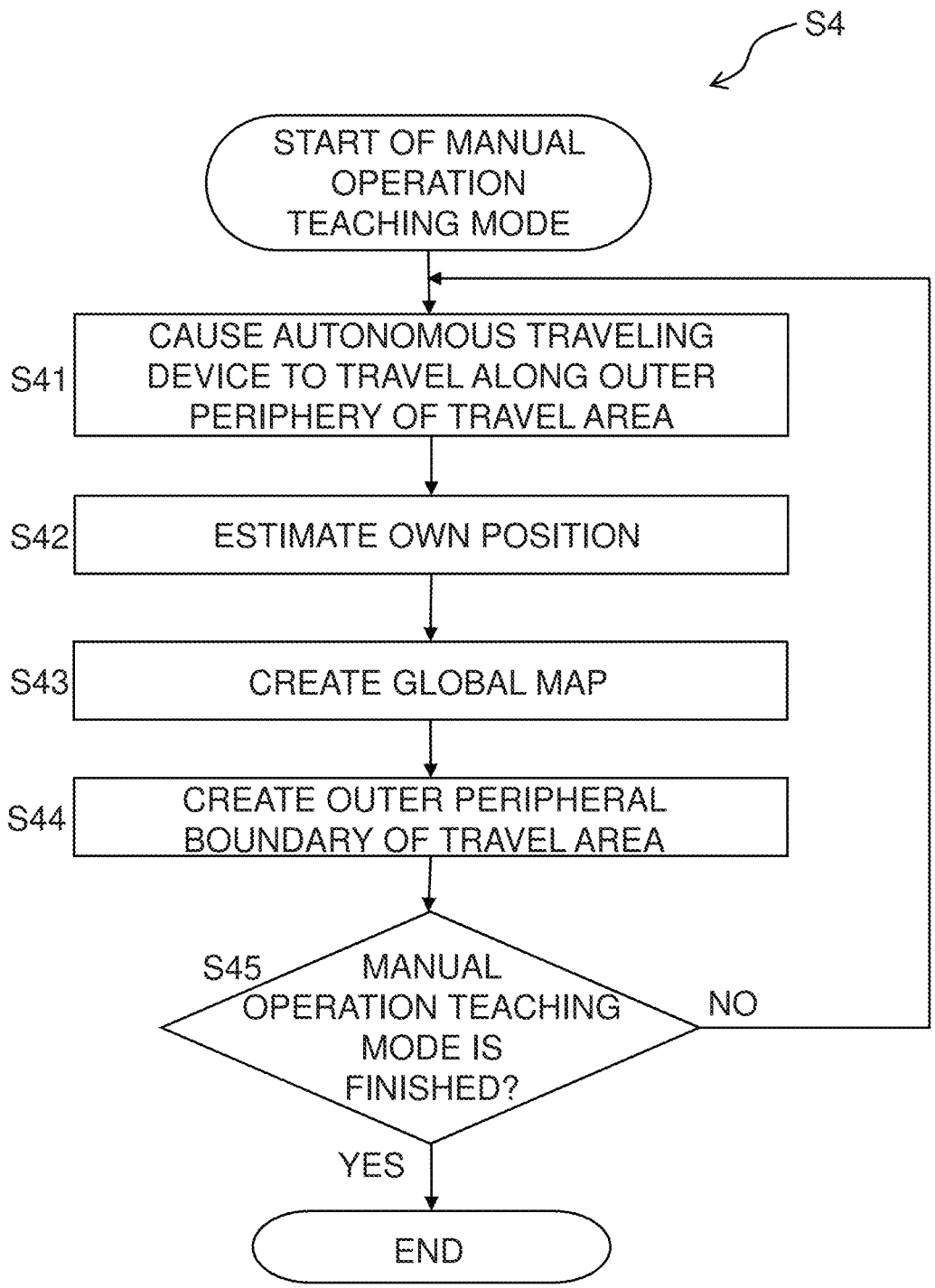
FIG. 8 is a flowchart showing an operation in a manual operation teaching mode.

Hereinafter, with reference to FIG. 8, operations of the manual operation teaching mode executed in Step S4 described above are described. FIG. 8 is a flowchart showing operations in the manual operation teaching mode.

In the manual operation teaching mode illustrated in FIG. 8, the global map GM indicating the movement environment EV is created, and an outer periphery BO' of the travel area TA where the autonomous traveling device 100 autonomously travels, is taught.

When the manual operation teaching mode is started, in Step S41, the operator of the autonomous traveling device 100 first causes the autonomous traveling device 100 to travel along the outer periphery BO' of the travel area TA set in the movement environment EV.

While the autonomous traveling device 100 is traveling by the operator's operation, the SLAM unit 551 estimates points passed during the movement along the outer periphery BO' of the travel area TA, in Step S42.

Specifically, while the autonomous traveling device 100 is traveling by the operator's operation, the SLAM unit 551 creates the local map every predetermined period (e.g. every control period of the control unit 5). Next, the SLAM unit 551 estimates the current position of the autonomous traveling device 100 using the local map described above and the global map GM that was created before the present execution of Step S42 and is stored in the storage unit 57.

After estimating the current position, in Step S43 the SLAM unit 551 combines the local map that was created when the present position was estimated, with the global map GM that is currently stored in the storage unit 57, so that a new global map GM is created and stored in the storage unit 57.

Specifically, for example, the SLAM unit 551 puts the local map created in Step S42 at a position corresponding to the current position of the global map GM that has been created, so as to create the new global map GM.

In addition, in Step S44, the route creation unit 553 creates an outer peripheral boundary BO indicating the outer periphery of the travel area TA, as a set of the points passed by the autonomous traveling device 100 until the present position is estimated.

Specifically, the route creation unit 553 obtains the current position estimated in Step S42 from the SLAM unit 551, and combines coordinate values of this position with the coordinate values of the positions estimated before, so as to create the outer peripheral boundary BO as a set of the coordinate values of the positions.

Steps S41 to S44 described above are executed repeatedly until the manual operation teaching mode is finished (until "Yes" in Step S45), by an event such as when the manual operation memory switch 92 is pressed.

Figure 9:
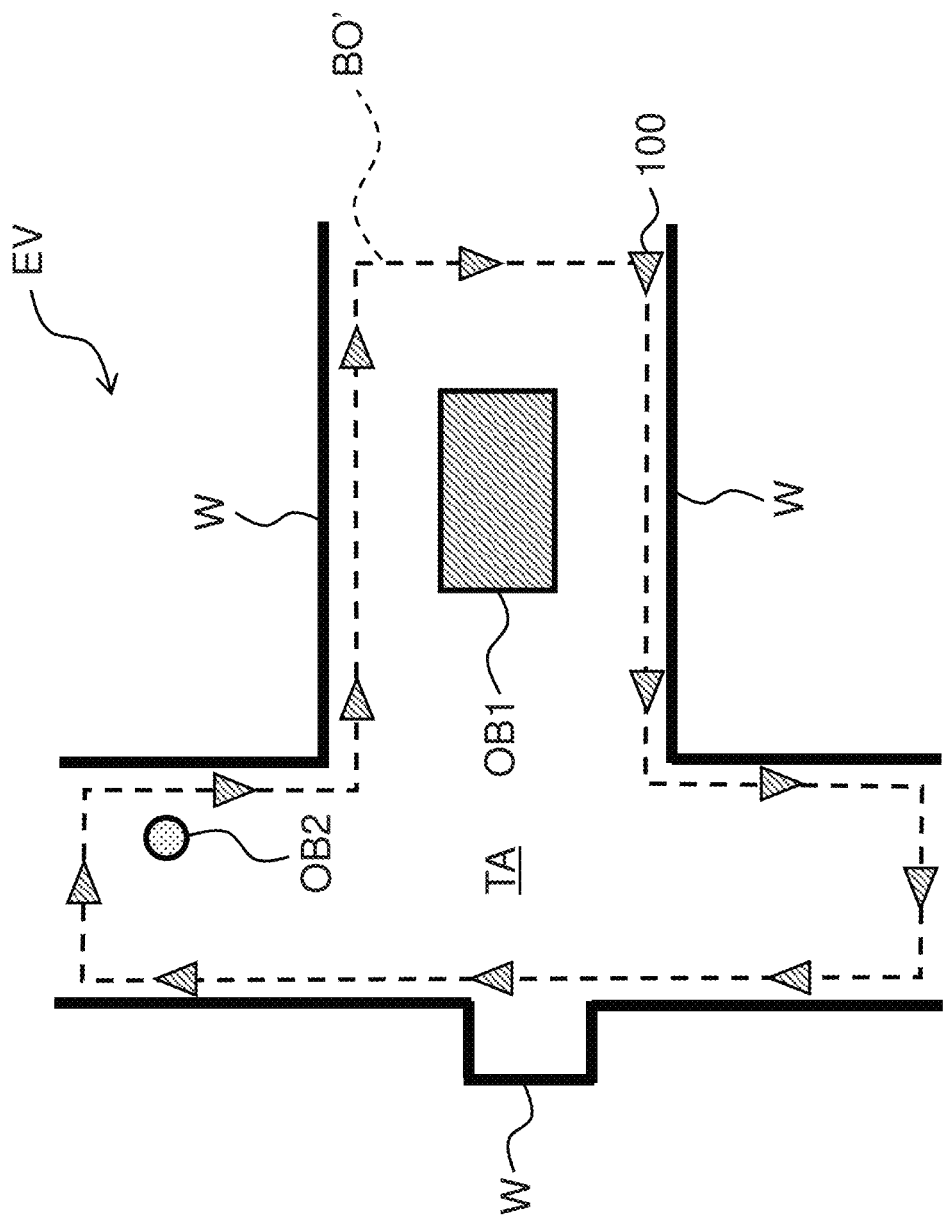
FIG. 9 is a diagram illustrating an example of a movement environment.

Hereinafter, the global map GM and the outer peripheral boundary BO are described, which are created by executing Steps S41 to S45 described above for the movement environment EV as illustrated in FIG. 9. FIG. 9 is a diagram illustrating an example of the movement environment.

In the movement environment EV illustrated in FIG. 9, the travel area TA having the outer periphery BO' shown by a broken line is set in an area surrounded by a wall W (an area in which the autonomous traveling device 100 can travel). In addition, a large obstacle OB1 that never moves and a small obstacle OB2 that moves exist in the travel area TA.

Figure 10:
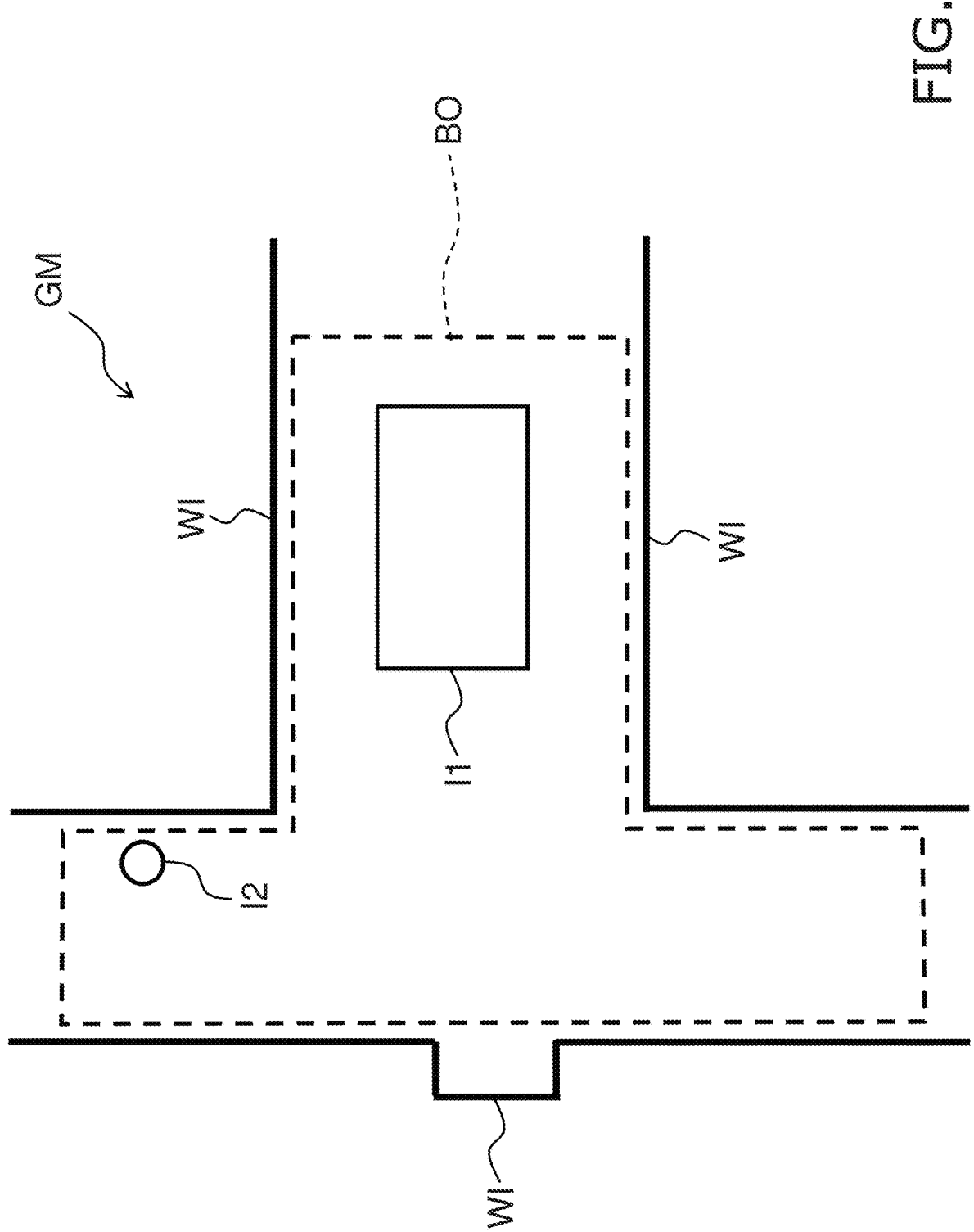
FIG. 10 is a diagram illustrating an example of a global map and an outer peripheral boundary.

In the movement environment EV and the travel area TA as illustrated in FIG. 9, the global map GM and the outer peripheral boundary BO as illustrated in FIG. 10 are created by executing Steps S41 to S45 described above while causing the autonomous traveling device 100 to travel along the outer periphery BO'. It should be noted that, in FIG. 10, the global map GM is shown by solid lines, and the outer peripheral boundary BO is shown by a broken line. FIG. 10 is a diagram illustrating an example of the global map and the outer peripheral boundary.

As illustrated in FIG. 10, the global map GM includes obstacle information WI indicating the wall W of the movement environment EV, obstacle information I1 of the obstacle OB1 that never moves, and obstacle information I2 of the obstacle OB2 that moves.

Figure 11:
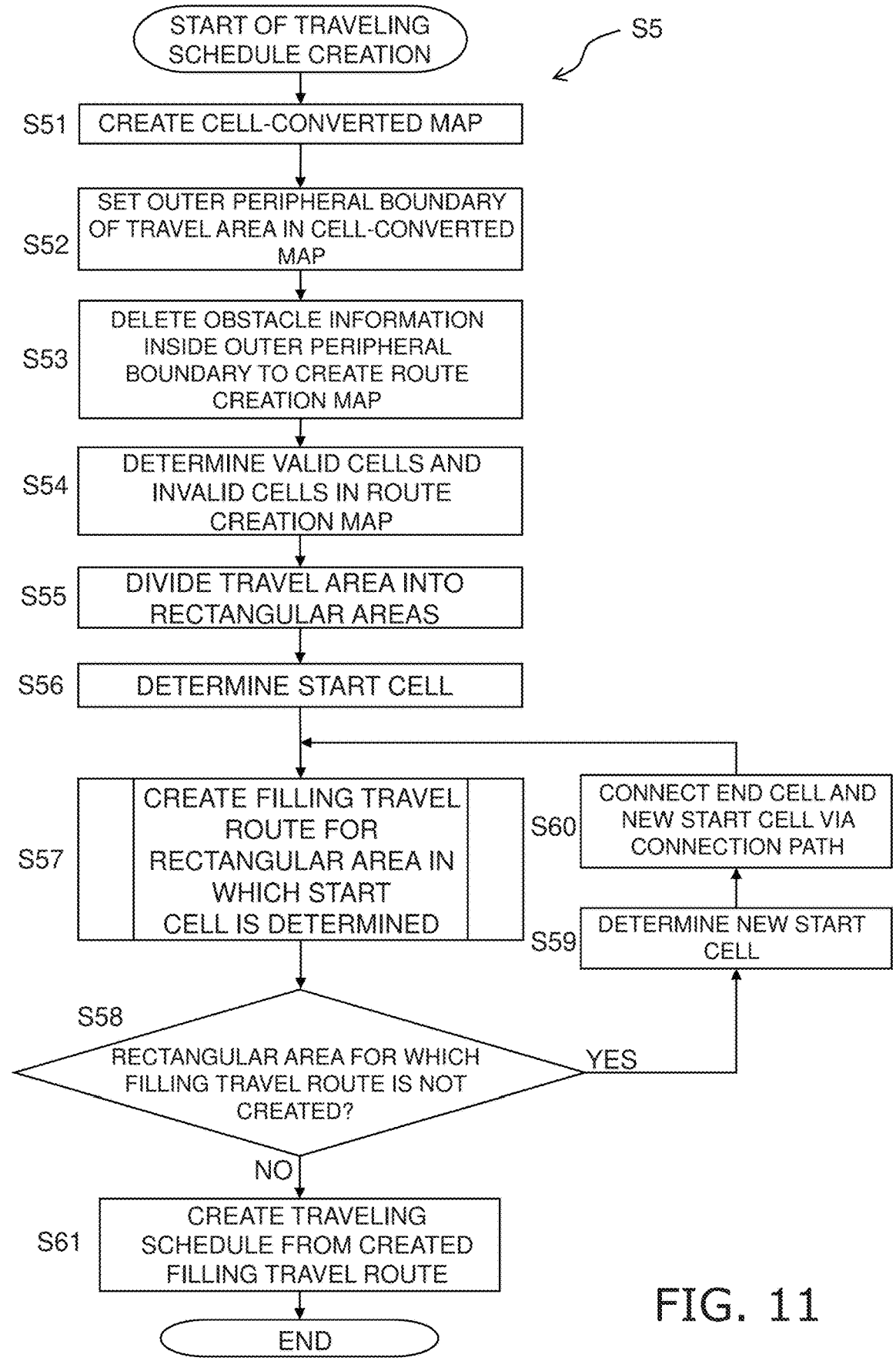
FIG. 11 is a flowchart showing an operation of creating a traveling schedule.

Next, with reference to FIG. 11, the operation of creating the traveling schedule 500 is described, which is performed in Step S5 described above. FIG. 11 is a flowchart showing the operation of creating the traveling schedule. In the following description, an operation of creating the traveling schedule 500, which is a filling travel route to fill in the travel area TA defined by the outer peripheral boundary BO, which has been created by executing Steps S41 to S45 described above, is described.

When the operation of creating the traveling schedule 500 is started, in Step S51 the route creation unit 553 creates a cell-converted map CM that expresses the global map GM as an aggregation of cells of the "cells C", using the global map GM created by executing Steps S41 to S45 described above.

The cell C corresponds to a small region having a predetermined area in the movement environment EV. Considering a process performed by the control unit 5, the cell C can be defined as a "structure" including, for example, parameters related to the cell C (e.g. a parameter for identifying the cell C, position information of the cell C, valid or invalid of the cell C, a score assigned to the cell C, and the like).

Figure 12:
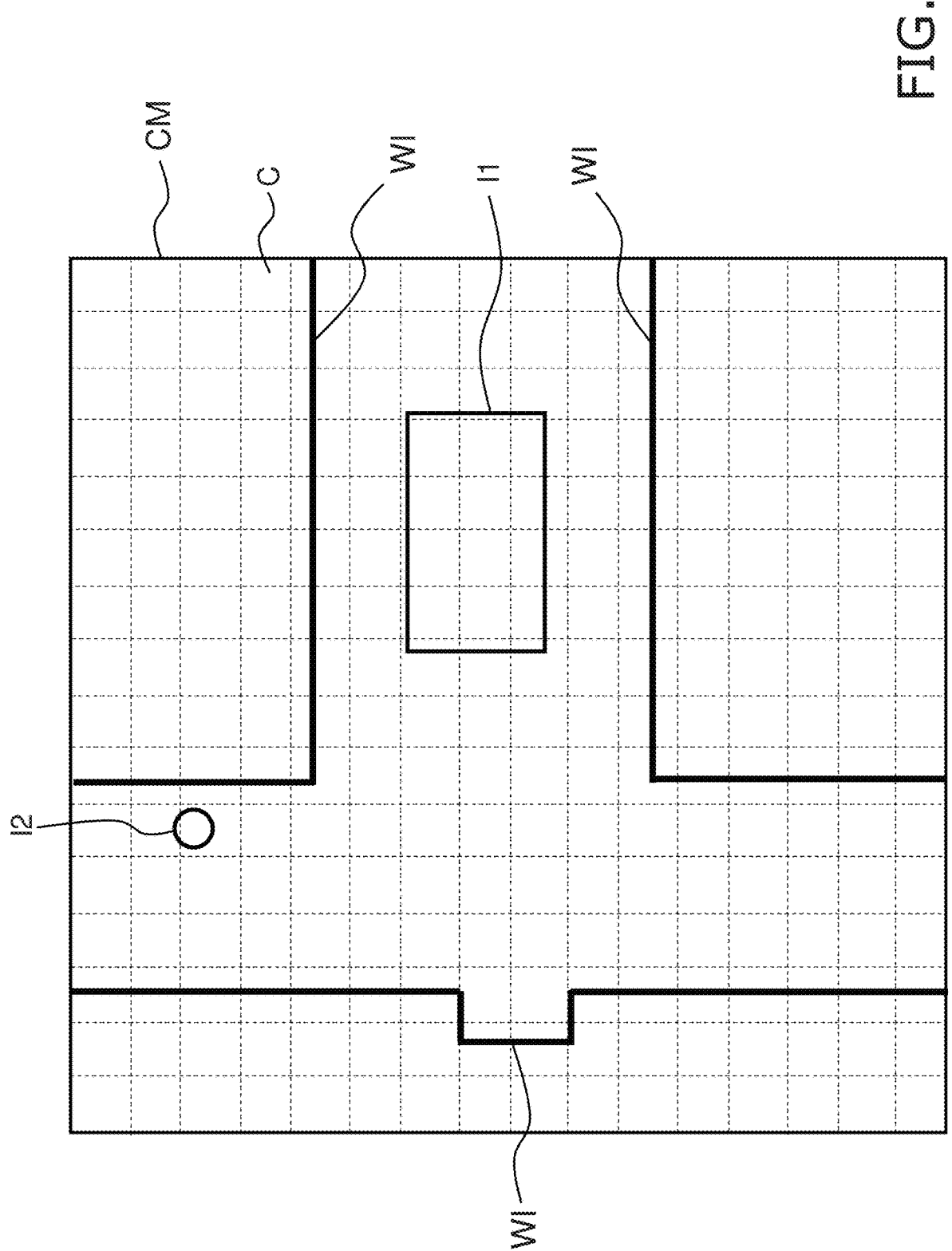
FIG. 12 is a diagram illustrating an example of a cell-converted map.

Specifically, the route creation unit 553 first puts the cells C on a coordinate plane defining the global map GM. After that, the route creation unit 553 projects the global map GM on the coordinate plane on which the cell C are placed, so as to create the cell-converted map CM. In this way, for example, the cell-converted map CM as illustrated in FIG. 12 is created corresponding to the global map GM illustrated in FIG. 10. FIG. 12 is a diagram illustrating an example of the cell-converted map.

The cell-converted map CM illustrated in FIG. 12 includes the obstacle information WI indicating the wall W, the obstacle information I1 of the obstacle OB1, and the obstacle information I2 of the obstacle OB2, which were included in the global map GM, as they are.

It should be noted that the cell-converted map CM is map information associated with the global map GM, while it is created independently from the global map GM. In other words, the control unit 5 regards the cell-converted map CM as data different from the global map GM.

As described later, the global map GM is used to estimate position of the autonomous traveling device 100 when the autonomous travel is performed. On the other hand, the cell-converted map CM is used to create a route creation map SM (described later) that is used to create the traveling schedule 500.

After creating the cell-converted map CM, in Step S52 the route creation unit 553 sets the outer peripheral boundary BO by associating the outer peripheral boundary BO with the global map GM. Specifically, the outer peripheral boundary BO of the travel area TA is set in the cell-converted map CM that is associated with the global map GM.

Figure 13:
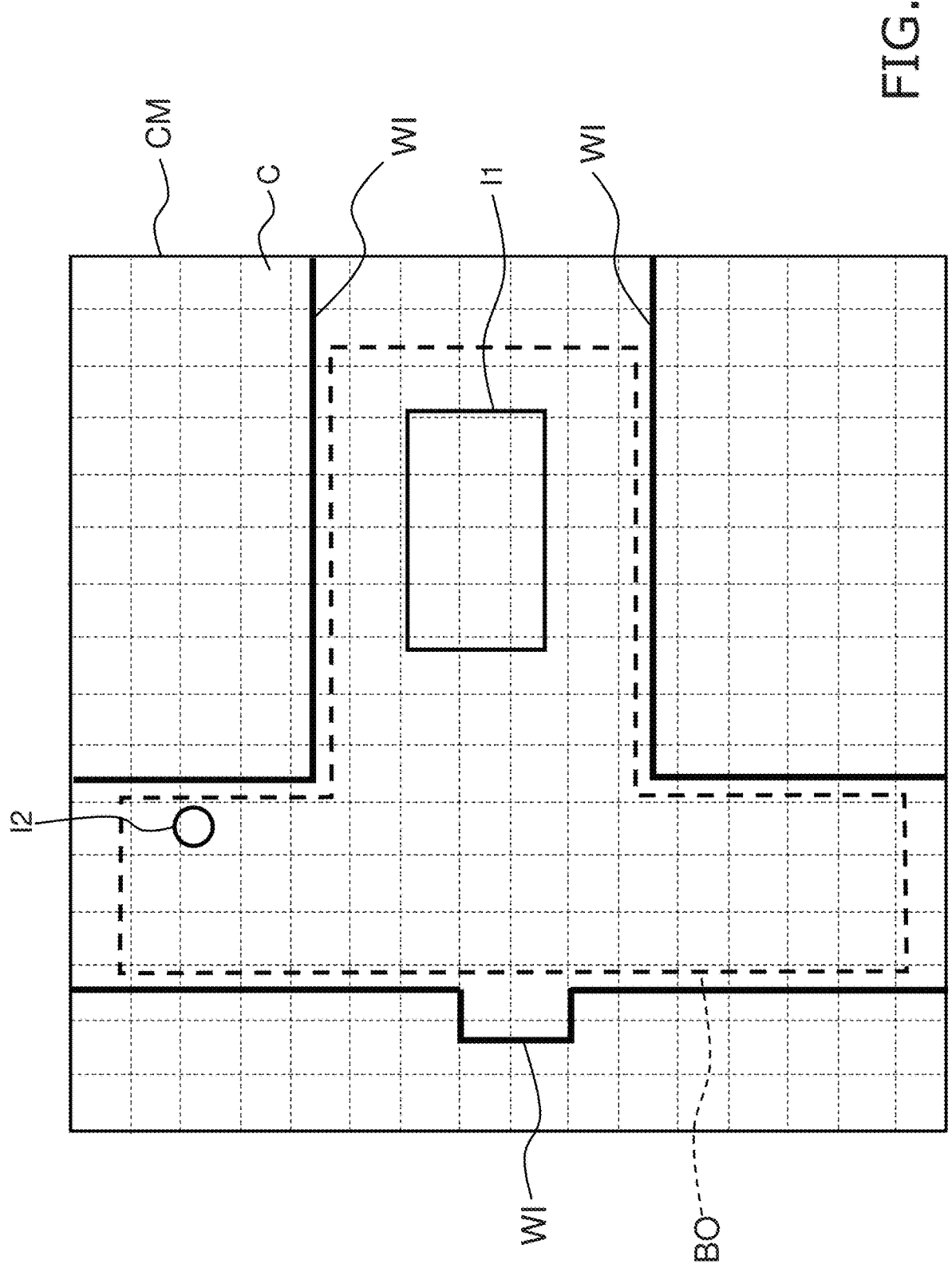
FIG. 13 is a diagram illustrating an example of the cell-converted map after setting the outer peripheral boundary.

More specifically, as illustrated in FIG. 13, the route creation unit 553 makes the cell-converted map CM to include the outer peripheral boundary BO as a set of coordinate values of the positions created by executing Steps S41 to S45 described above. FIG. 13 is a diagram illustrating an example of the cell-converted map after setting the outer peripheral boundary.

After setting the outer peripheral boundary BO in the cell-converted map CM, the route creation unit 553 deletes obstacle information included inside the outer peripheral boundary BO set in the cell-converted map CM, so as to create the route creation map SM (an example of a second map) in Step S53.

Specifically, for example, in the cell-converted map CM after setting the outer peripheral boundary BO, the route creation unit 553 scans coordinate points (pixels in a two-dimensional cell-converted map CM or voxels in a three-dimensional cell-converted map CM) in the area surrounded by the outer peripheral boundary BO. If obstacle information exists in the coordinate point (pixel or voxel) in the area surrounded by the outer peripheral boundary BO, the route creation unit 553 deletes the obstacle information. In this way, the route creation unit 553 can delete the obstacle information inside the outer peripheral boundary BO by pixel or voxel.

Figure 14:
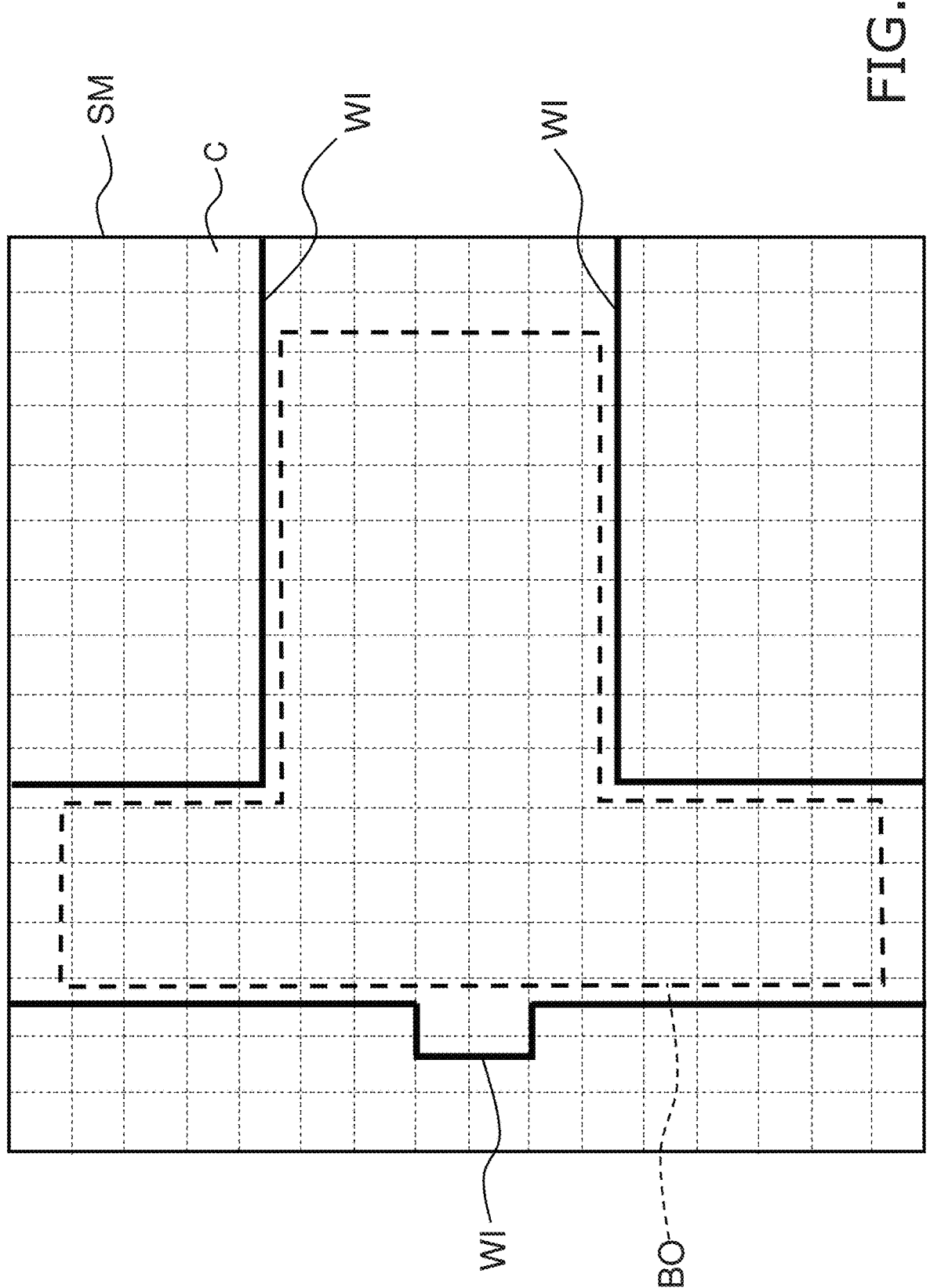
FIG. 14 is a diagram illustrating an example of a route creation map.

By the process described above, as illustrated in FIG. 14, the route creation unit 553 can easily create the route creation map SM, in which all obstacle information I1 and I2 existing inside the outer peripheral boundary BO are deleted from the cell-converted map CM illustrated in FIG. 13, without determining characteristics of the obstacles expressed by the obstacle information inside the outer peripheral boundary BO (such as whether or not to move). FIG. 14 is a diagram illustrating an example of the route creation map.

After creating the route creation map SM, in Step S54 the route creation unit 553 determines valid cells VC and invalid cells INC for the cells C included in the route creation map SM. The valid cell VC is a cell in which the autonomous traveling device 100 can travel in the route creation map SM. On the other hand, the invalid cell INC is a cell in which the autonomous traveling device 100 cannot travel in the route creation map SM.

Specifically, for example, the route creation unit 553 determines that the cells C including the obstacle information WI indicating the wall W or the outer peripheral boundary BO, and the cells C outside the obstacle information WI indicating the wall W or the outer peripheral boundary BO are the invalid cells INC. The route creation unit 553 assigns the invalid cells INC with a "score" indicating that the autonomous traveling device 100 cannot travel (e.g. 0 or a negative value such as −1).

On the other hand, the route creation unit 553 determines that rest of the cells that are not the invalid cells INC among the cells C included in the route creation map SM are the valid cells VC.

By executing Step S54 described above to determine the valid cells VC and the invalid cells INC in the route creation map SM, the travel area TA can be set in the route creation map SM. Specifically, the region occupied by the valid cells VC in the route creation map SM is set as the travel area TA.

Figure 15:
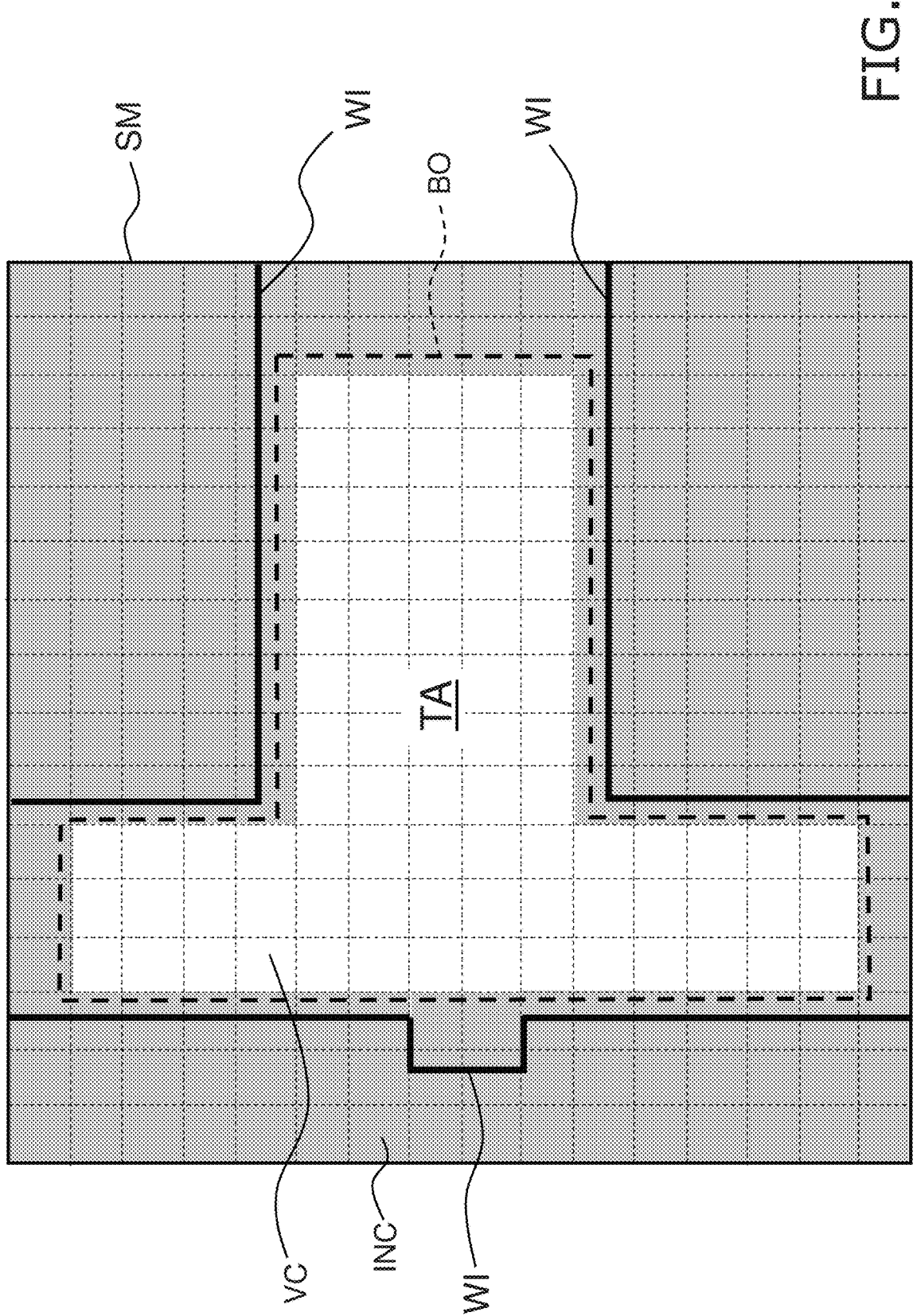
FIG. 15 is a diagram illustrating an example of valid cells and invalid cells in the route creation map.

By executing Step S54 described above, in the route creation map SM illustrated in FIG. 14, the valid cells VC and the invalid cells INC are determined as illustrated in FIG. 15. In FIG. 15, white cells C are valid cells VC, and colored cells C are invalid cells INC.

FIG. 15 is a diagram illustrating an example of valid cells and invalid cells in the route creation map.

After setting the travel area TA in the route creation map SM, the route creation unit 553 creates the traveling schedule 500, which is the filling travel route to fill in the travel area TA included in the route creation map SM created in Steps S51 to S54 described above. In this preferred embodiment, the filling travel route is created as follows.

First, in Step S55, the route creation unit 553 divides the travel area TA into rectangular areas RA. When dividing the travel area TA into the rectangular areas RA, the route creation unit 553 searches for a direction in which the rectangular area RA extends in the travel area TA. In the following description, the direction in which the rectangular area RA extends is referred to as a "major direction". Specifically, the major direction of the rectangular area RA can be searched for as follows.

First, the route creation unit 553 sets a predetermined reference axis in the route creation map SM, and rotates the route creation map SM by a predetermined angle. Next, the route creation unit 553 defines a plurality of line segments that are parallel to the reference axis described above and connects boundaries (outer peripheral boundary BO) of the travel area TA in the entire travel area TA included in the route creation map SM after the rotation. For instance, the line segments each of which connects two points on the outer peripheral boundary BO expressed as a row of points and are parallel to the reference axis are defined in the entire travel area TA.

The route creation unit 553 integrates lengths of the line segments having a length in a predetermined range among the plurality of line segments. This calculation of the integrated value is performed on the line segments in a range sandwiched by boundary portions of the rectangular area. The boundary portion of the rectangular area can be recognized as a portion where the length of the line segment connecting boundaries of the travel area TA changes rapidly.

The "length in a predetermined range" described above is, for example, less than or equal to a maximum length $L_{max}$ (e.g. a diagonal length of the rectangular area) of the rectangular area, and more than or equal to a length ($\alpha * L_{max}$) shorter than the maximum length $L_{max}$ of the rectangular area by a predetermined ratio $\alpha$ ($0<\alpha<1$).

The route creation unit 553 can determine the major direction of the rectangular area RA based on a rotation angle of the route creation map SM when a maximum integrated value is calculated, among the integrated values calculated for individual rotation angles in the travel area TA. Specifically, this rotation angle with opposite sign (−θ if the rotation angle of the route creation map is θ) can be determined to be the major direction of the rectangular area RA.

Figure 16:
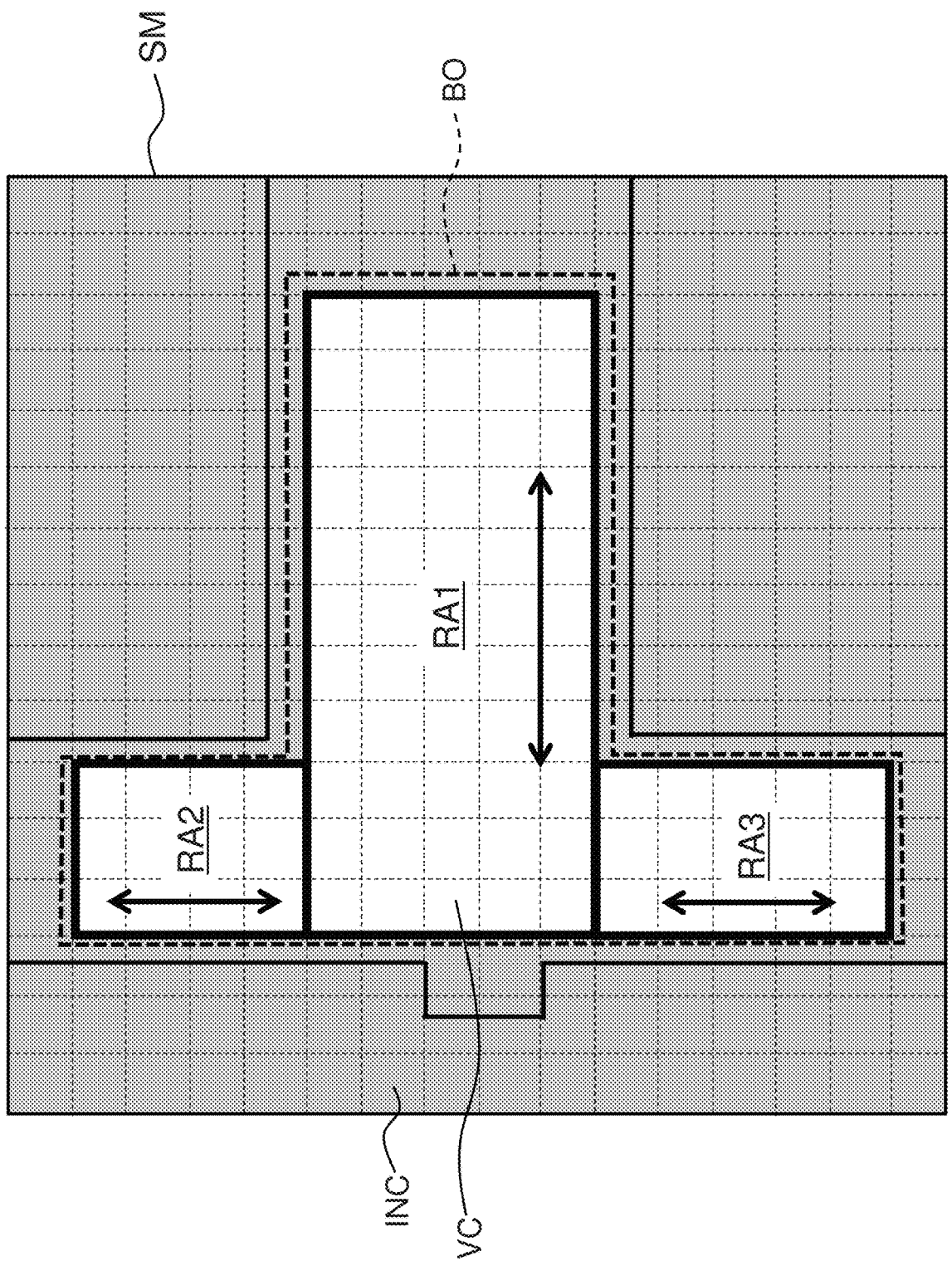
FIG. 16 is a diagram illustrating an example of a state in which the travel area is divided into rectangular areas.

By the process described above, for example, the route creation unit 553 can divide the travel area TA in the route creation map SM illustrated in FIG. 15 into three rectangular areas RA1 to RA3 as illustrated in FIG. 16. It should be noted that, in FIG. 16, arrows in the rectangular areas RA1 to RA3 indicate major directions of the rectangular areas RA1 to RA3, respectively. FIG. 16 is a diagram illustrating an example of a state where the travel area is divided into rectangular areas.

After dividing the travel area TA into the rectangular areas RA1 to RA3, the route creation unit 553 creates the filling travel routes for the rectangular areas RA1 to RA3 so as to fill in the rectangular areas RA1 to RA3, respectively. Specifically, the filling travel routes are created as follows.

First, in Step S56, the route creation unit 553 determines a valid cell VC to be a start point of the filling travel route (referred to as a start cell SC) in each of the rectangular areas RA1 to RA3. For instance, the route creation unit 553 determines the start cell SC, which is a valid cell VC corresponding to the position where the autonomous traveling device 100 started traveling when teaching the outer periphery BO' of the travel area TA (when creating the outer peripheral boundary BO) or a position near the position, and exists in one of corners of the rectangular area.

Figure 17:
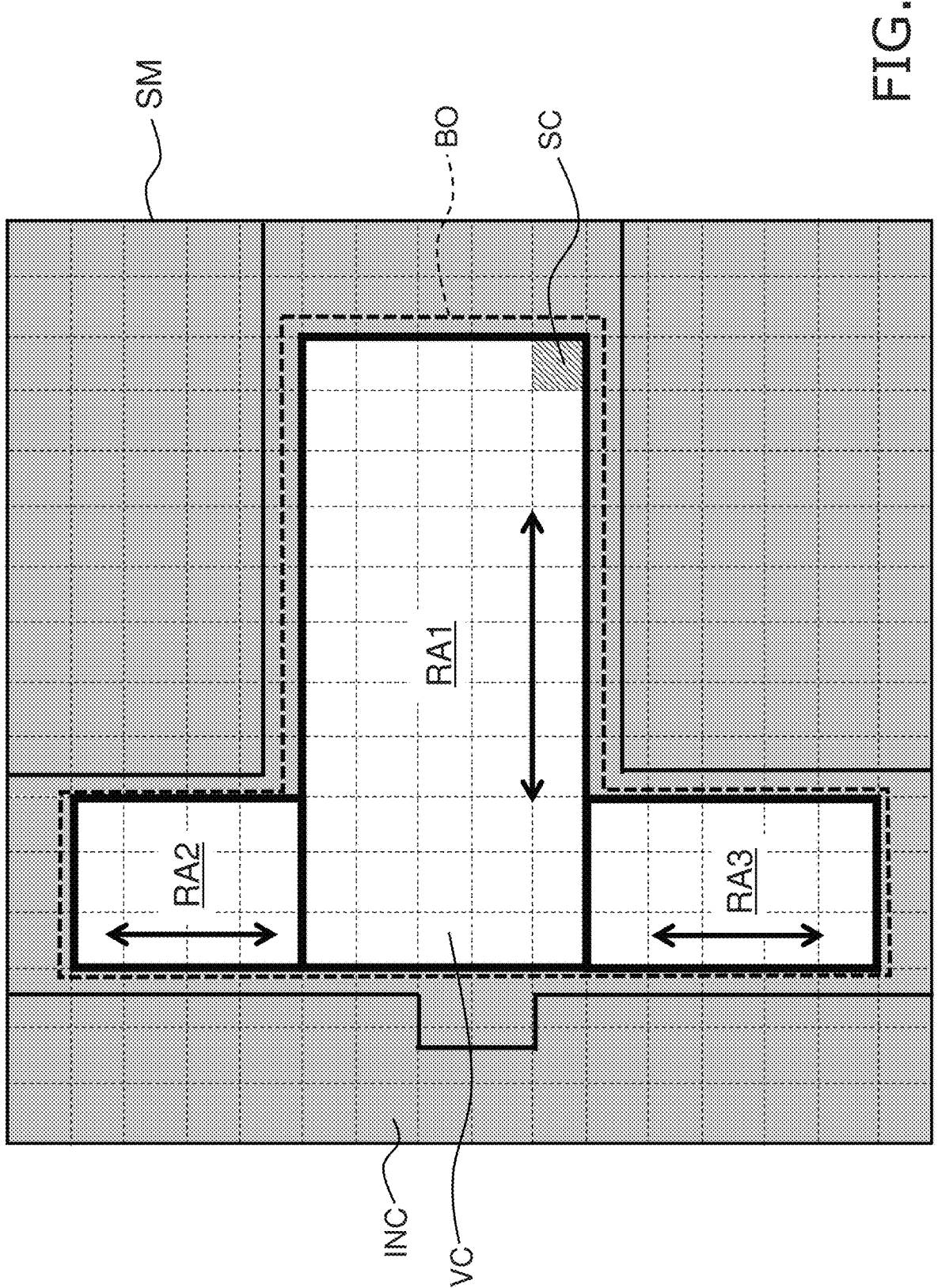
FIG. 17 is a diagram illustrating an example of a start cell determined in a rectangular area for which the filling travel route is created first.

By the process described above, for example, the start cell SC as illustrated in FIG. 17 can be set for the route creation map SM illustrated in FIG. 16. In the example illustrated in FIG. 17, the start cell SC is set in a corner of the rectangular area RA1. In other words, the rectangular area in which the filling travel route is created first is determined as the rectangular area RA1.

FIG. 17 is a diagram illustrating an example of the start cell determined in the rectangular area for which the filling travel route is created first.

After determining the start cell SC, the route creation unit 553 creates the filling travel route in Step S57. The filling travel route created in this preferred embodiment is a travel route that starts from the start cell SC and passes through all the valid cells VC included in the target rectangular area RA1 to RA3 (the rectangular area RA1 in the example of FIG. 17).

Figure 18:
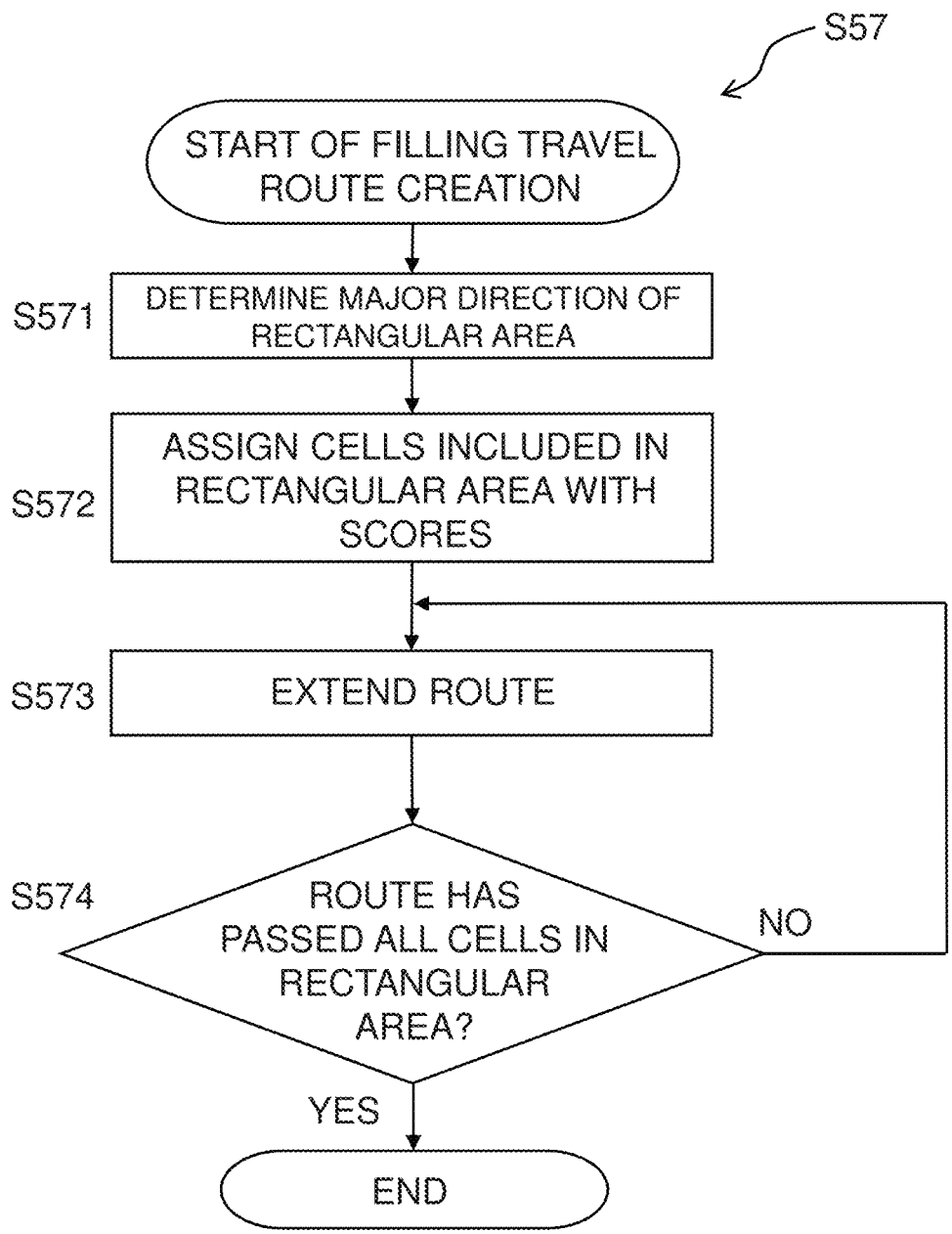
FIG. 18 is a flowchart showing a method of creating the filling travel route.

The route creation unit 553 creates the filling travel route according to the process illustrated in a flowchart of FIG. 18. FIG. 18 is a flowchart showing a method of creating the filling travel route.

In the following description, a method of creating the filling travel route for the rectangular area RA1 is exemplified. The filling travel route for other rectangular areas RA2 and RA3 can also be created by the method performed for the rectangular area RA1.

First, in Step S571, the route creation unit 553 determines the major direction of the rectangular area RA1. The major direction of the rectangular area RA1 can be the major direction that was determined when the travel area TA was divided into the rectangular areas RA1 to RA3 in Step S55 described above.

Next, in Step S572, the route creation unit 553 assigns the valid cells VC in the rectangular area RA1 with scores. Specifically, the route creation unit 553 assigns higher scores to the valid cells VC apart from the start cell SC in the direction perpendicular to the major direction. On the other hand, the same score is assigned to the valid cells VC arranged in the major direction.

Figure 19:
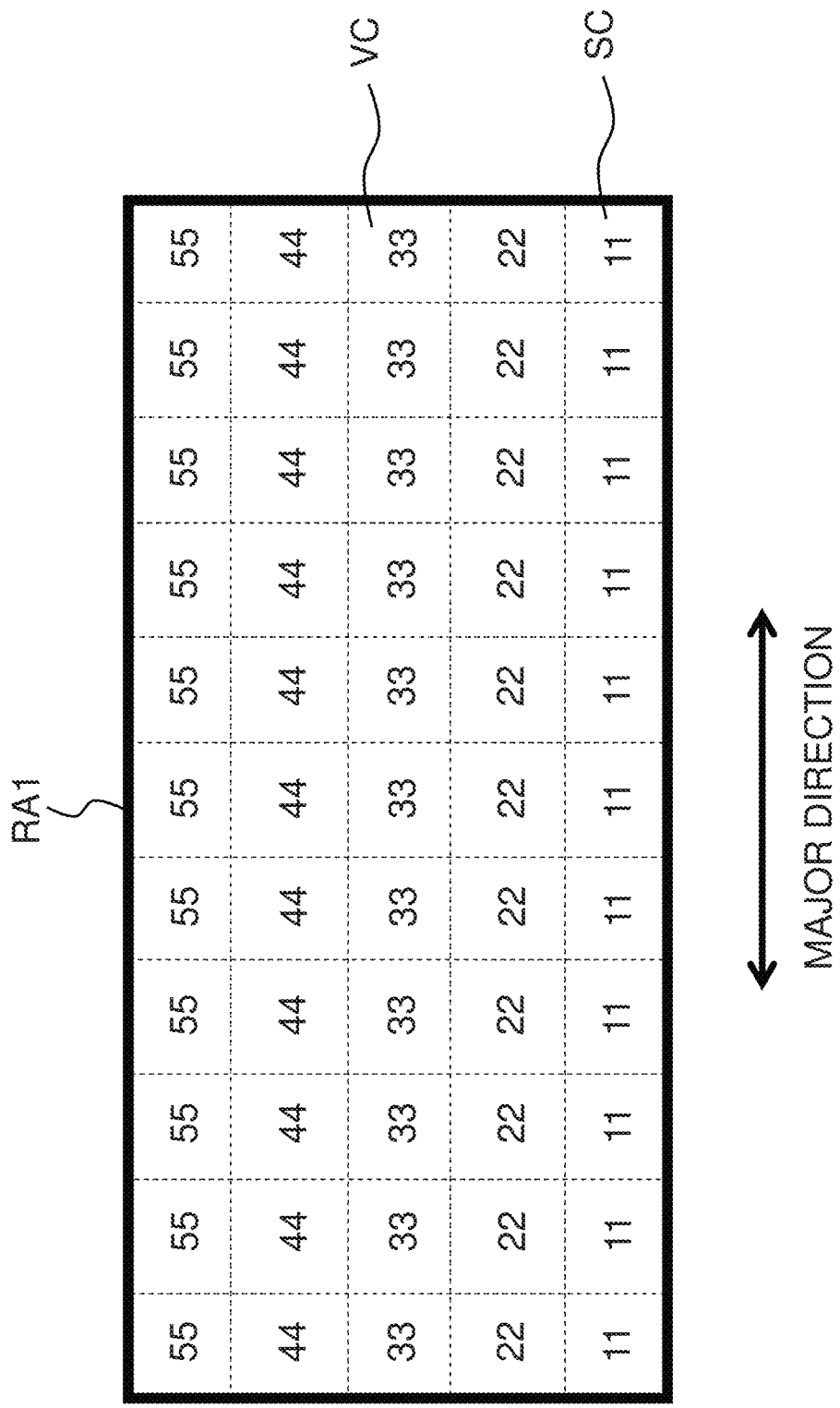
FIG. 19 is a diagram illustrating an example of scores assigned to cells in the rectangular area.

As a result, the route creation unit 553 assigns the valid cells in the rectangular area RA1 with scores as illustrated in FIG. 19. FIG. 19 is a diagram illustrating an example of scores assigned to cells in the rectangular area.

In the example illustrated in FIG. 19, the valid cells VC arranged in the major direction from the start cell SC are assigned with a score of 11. This means that there are 11 valid cells in the major direction in the rectangular area RA1.

As for other valid cells VC, the score increases by multiple of 11 as being apart from the start cell SC in the direction perpendicular to the major direction.

Specifically, a score of 22 is assigned to the valid cell VC adjacent to the start cell SC in the direction perpendicular to the major direction. In addition, the same score of 22 is assigned to the valid cells VC arranged in the major direction from the valid cell VC assigned with a score of 22 as described above.

After that, the valid cells VC apart from the start cell SC more than the valid cell VC assigned with a score of 22 are assigned with scores of 33, 44, and 55, which are increased more as being apart from the start cell SC, and the valid cells VC arranged in the major direction are assigned with the same score.

Next, in Step S573, the route creation unit 553 extends the route from the start cell SC to the valid cells VC. Specifically, the route creation unit 553 extends the route from the start cell SC to the valid cell VC assigned with the maximum score out of the valid cells VC adjacent to the start cell SC in the major direction or the direction perpendicular to the major direction.

In addition, the route creation unit 553 does not extend the route again to the valid cell VC to which the route is once extended, unless there is a special reason such that the route planning cannot be completed without passing the valid cell VC again.

Step S573 described above is executed repeatedly as long as there is any valid cell VC where the route does not pass in the rectangular area RA1 (as long as "No" in Step S574).

Figure 20:
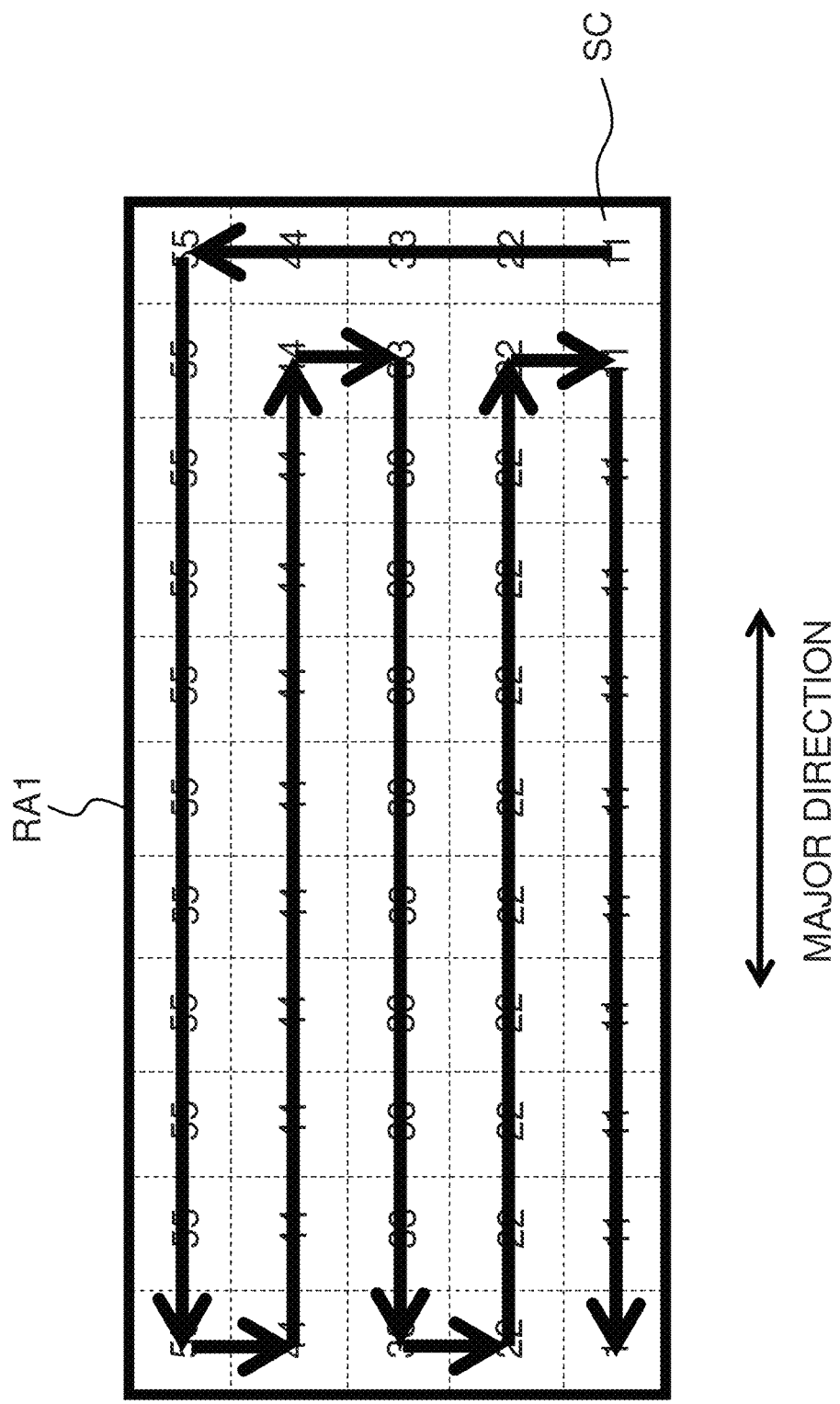
FIG. 20 is a diagram illustrating an example of the filling travel route.

As the route creation unit 553 executes Steps S571 to S574 described above, the filling travel route as illustrated in FIG. 20 is created for the rectangular area RA1. In FIG. 20, thick arrows indicate the filling travel route. FIG. 20 is a diagram illustrating an example of the filling travel route.

As illustrated in FIG. 20, the filling travel route is created as a combination of first paths extending in the major direction in the rectangular area RA1 and second paths extending perpendicularly to the major direction. In this way, the filling travel route that thoroughly fill in the rectangular area RA1 can be created as a route along which the autonomous traveling device 100 can travel by simple movements of going straight and turning.

In addition, in the filling travel route illustrated in FIG. 20, the first path extends over a plurality of valid cells in the major direction. On the other hand, the second path extends only one cell except for the path starting from the start cell SC. In other words, the filling travel route created by executing Steps S571 to S574 described above includes longer paths in the major direction in the rectangular area. In this way, by setting longer paths along the major direction in the rectangular area, the number of turning of the autonomous traveling device 100 in the filling travel route can be reduced.

After creating the filling travel route in one rectangular area RA1, in Step S58 the route creation unit 553 determines whether or not there is any rectangular area RA1 to RA3 for which the filling travel route is not yet created.

If there is no rectangular area RA1 to RA3 for which the filling travel route is not created ("No" in Step S58), the process of creating the traveling schedule 500 proceeds to Step S61 described later.

On the other hand, if there is any rectangular area RA1 to RA3 for which the filling travel route is not created ("Yes" in Step S58), in Step S59 the route creation unit 553 determines a new start cell SC of the filling travel route to be created next.

For instance, the route creation unit 553 determines the new start cell SC, which is the valid cell VC having the shortest distance from an end cell EC that is the end point of the filling travel route created in the rectangular area RA1. In this way, the rectangular area RA2, RA3 including the new start cell SC can be determined as the rectangular area for which the filling travel route is to be created next.

Figure 21:
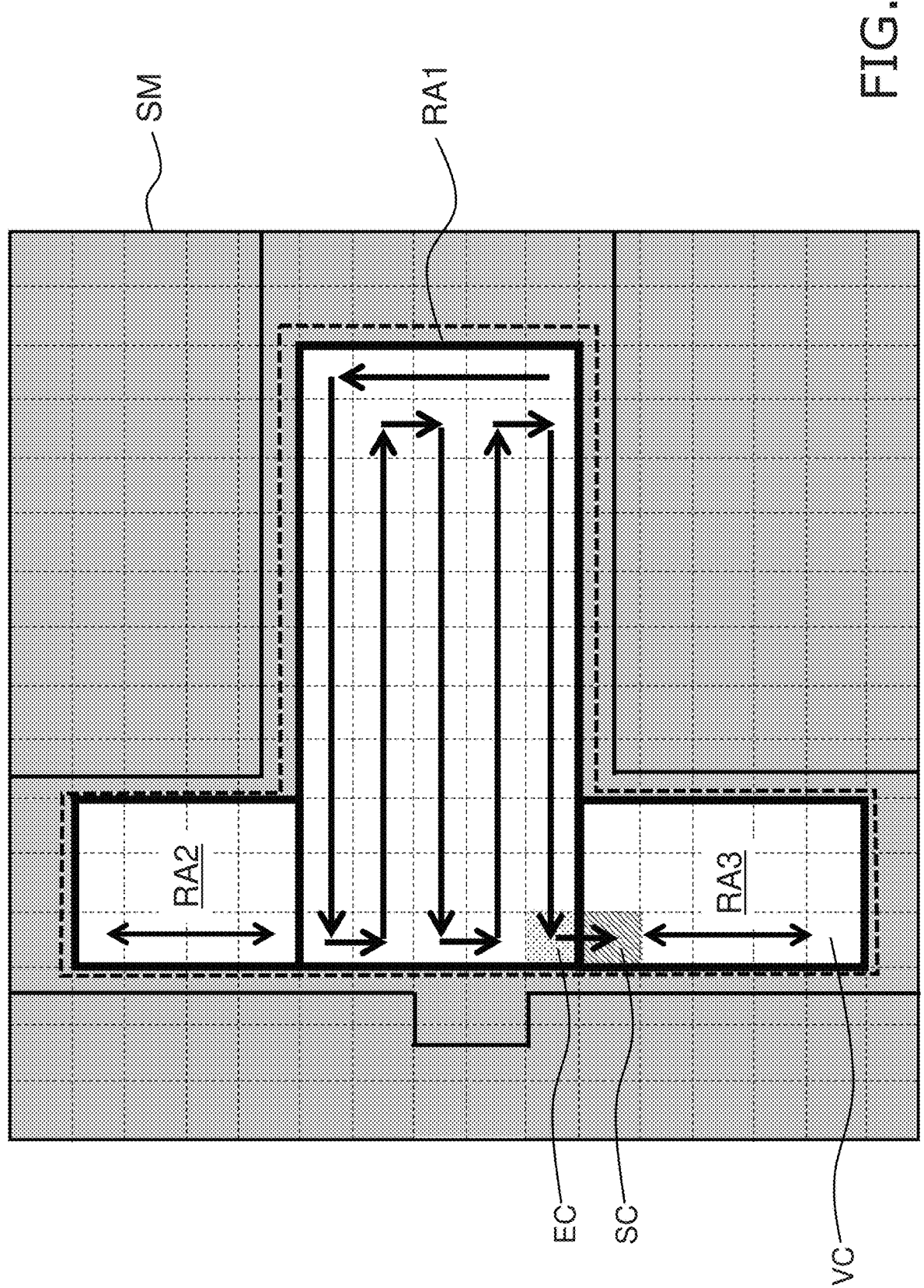
FIG. 21 is a diagram schematically illustrating an example of a method of determining a new start cell and a rectangular area for which the filling travel route is created next.

For instance, as illustrated in FIG. 21, when the end cell EC is set at the lower left in the rectangular area RA1 on the paper, the valid cell VC adjacent to the end cell EC is determined as the new start cell SC, and the rectangular area RA3 including the new start cell SC is determined as the rectangular area for which the filling travel route is to be created next. FIG. 21 is a diagram schematically illustrating an example of a method for determining the new start cell and the rectangular area for which the filling travel route is to be created next.

In this way, if there are a plurality of the rectangular areas RA2 and RA3 for which the filling travel route is not created, the valid cell VC that can be connected to the end cell EC as the end point of the created filling travel route by the shortest distance is determined as the new start cell SC, and the rectangular area including the new start cell SC is determined as the rectangular area for which the filling travel route is to be created next, so that the traveling schedule 500 having the shortest distance and good travel efficiency can be created.

After determining the new start cell SC and the rectangular area for which the filling travel route is to be created next, in Step S60 the route creation unit 553 connects the end cell EC as the end point of the created filling travel route and the determined new start cell SC via a connection path.

After that, the process of creating the traveling schedule 500 returns to Step S57. In other words, the filling travel route is created in the rectangular area including the new start cell SC. Steps S57 (Steps S571 to S574) to S60 described above are executed repeatedly until the filling travel route is created in all rectangular area RA1 to RA3 (i.e., until "No" in Step S58).

Figure 22:
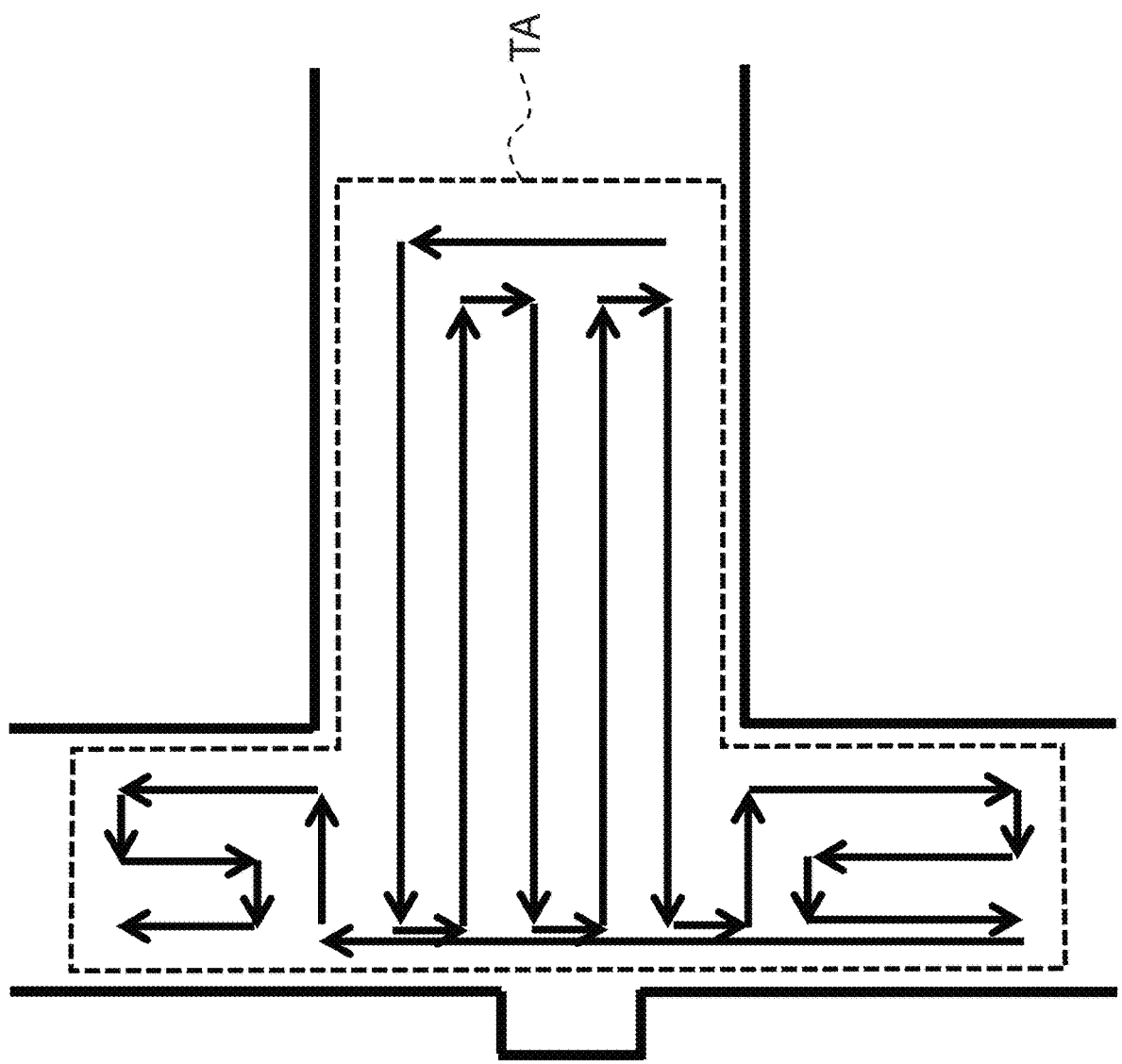
FIG. 22 is a diagram illustrating an example of the filling travel route created in the entire travel area.

By executing Steps S51 to S60 described above, the filling travel route is created, which thoroughly fill in the travel area TA as illustrated in FIG. 22, for the entire travel area TA illustrated in FIG. 9 and the like. In FIG. 22, the travel area TA is shown by a broken line, and the filling travel route created for the entire travel area TA is shown by thick arrows. FIG. 22 is a diagram illustrating an example of the filling travel route created for the entire travel area.

After creating the filling travel route, in Step S61 the route creation unit 553 converts the created filling travel route into a set of points through which the autonomous traveling device 100 passes. In addition, the route creation unit 553 assigns the points created by the conversion of the filling travel route with times at which the points are passed, respectively. Furthermore, the route creation unit 553 assigns the cleaning conditions at each point to the corresponding point, so as to create the traveling schedule 500 as illustrated in FIG. 23. FIG. 23 is a diagram illustrating an example of the traveling schedule.

In the traveling schedule 500 illustrated in FIG. 23, symbols T0, T1, . . . Tn represent times at which the point on the filling travel route are passed, respectively. (x0, y0), (x1, y1), . . . (xn, yn) express coordinate values of the points on the filling travel route. $\theta 0$, $\theta 1$, . . . $\theta n$ respectively represent directions of the autonomous traveling device 100 at the points on the filling travel route.

In the traveling schedule 500, symbols S0, S1, . . . Sn respectively represent supply amounts of the washing liquid at the points on the filling travel route. W0, W1, . . . Wn respectively represent cleaning powers on the floor surface F at the points on the filling travel route. P0, P1, . . . Pn respectively represent sucking forces of the suction opening O2 at the points on the filling travel route.

Figure 24:
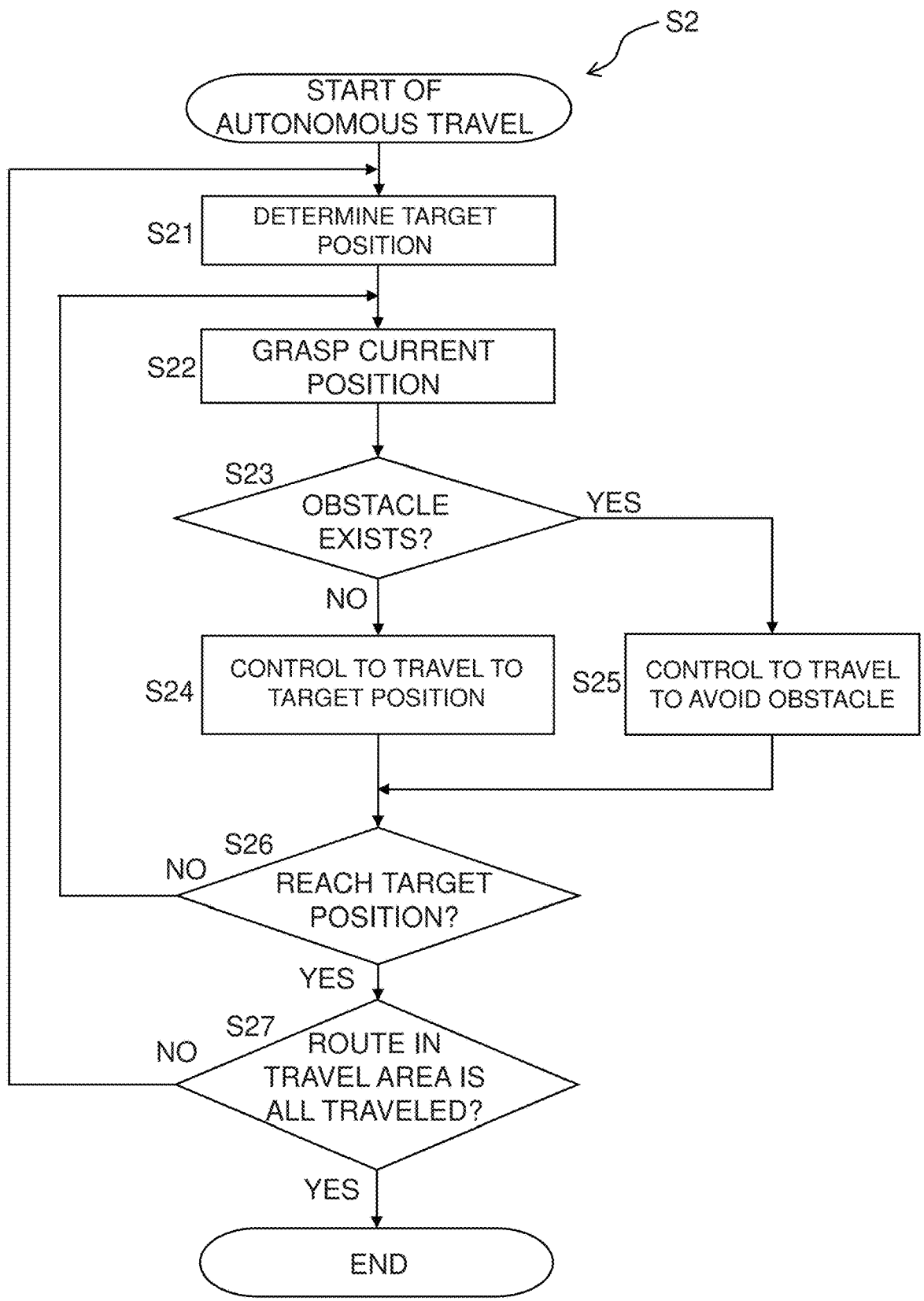
FIG. 24 is a flowchart showing an operation of the autonomous traveling device when performing an autonomous travel mode.

Next, with reference to FIG. 24, an operation of the autonomous traveling device 100 when the autonomous travel mode is executed, which is performed in Step S2 of FIG. 7, is described. FIG. 24 is a flowchart showing an operation of the autonomous traveling device when the autonomous travel mode is executed. In the autonomous travel mode, the autonomous traveling device 100 autonomously travels by reproducing the travel route recorded in the traveling schedule 500.

Before performing the autonomous travel mode, the user moves the autonomous traveling device 100 to a start position of the autonomous travel. The start position of the autonomous travel is the point associated with elapsed time T0 in the traveling schedule 500.

When the switching unit 91 selects "automatic", the autonomous travel mode is started. When the autonomous travel mode is started, in Step S21 the travel reproducing unit 555 determines a target position to which the autonomous traveling device 100 autonomously travels.

Specifically, the travel reproducing unit 555 determines current elapsed time associated with the point closest to the current position on the traveling schedule 500, and the point associated with next elapsed time after the current elapsed time is determined as a next target position. In this way, the next target position is set on the filling travel route recorded in the traveling schedule 500.

After determining the target position, the travel reproducing unit 555 starts control for the autonomous travel. First, in Step S22, the travel reproducing unit 555 determines the current position of the autonomous traveling device 100.

Specifically, the SLAM unit 551 estimates the current position of the autonomous traveling device 100, by the process described above, based on the amount of rotation of the travel motor 11 measured by the encoder 111 after the previous position estimation until the present position estimation, the local map created based on the obstacle information obtained at the current position, and the global map GM stored in the storage unit 57. After that, the travel reproducing unit 555 inputs the position estimated by the SLAM unit 551.

After the current position of the autonomous traveling device 100 is determined, travel control from the current position to the target position is performed. When performing the travel control, in Step S23 the travel reproducing unit 555 determines whether or not the obstacle detection unit 43 has detected an obstacle in the interference region on the future travel route that is the travel route from the current position to the target position.

The interference region is a region where the autonomous traveling device 100 passes when the autonomous traveling device 100 travels along the future travel route. For instance, the interference region is determined based on a size of the main body B of the autonomous traveling device 100, the driving speed of the autonomous traveling device 100, and the like. The obstacle included in the interference region can collide with the autonomous traveling device 100 that is traveling along the future travel route.

If no obstacle is detected in the interference region on the future travel route ("No" in Step S23), in Step S24 the travel reproducing unit 555 calculates the reproducing travel control command to cause the autonomous traveling device 100 to travel along the future travel route described above. Specifically, the travel reproducing unit 555 calculates the reproducing travel control command to cause the autonomous traveling device 100 to travel from the current position to the target position determined in Step S21. The travel reproducing unit 555 outputs the calculated reproducing travel control command to the travel control unit 53.

On the other hand, if an obstacle is detected in the interference region on the future travel route ("Yes" in Step S23), in Step S25 the travel reproducing unit 555 plans a route to avoid the detected obstacle (referred to as an avoidance route), and calculates the reproducing travel control command to cause the autonomous traveling device 100 to travel the planned route. The travel reproducing unit 555 outputs the calculated reproducing travel control command to the travel control unit 53.

In Step S25, the travel reproducing unit 555 changes the target position determined in Step S21 described above, depending on the planned avoidance route. For instance, among the points stored in the traveling schedule 500, the point apart from the current position by a predetermined distance is set as the new target position.

The travel control unit 53, which has received the reproducing travel control command described above, controls the travel motor 11 based on the received reproducing travel control command, so as to cause the autonomous traveling device 100 to travel according to the reproducing travel control command.

In addition, the travel reproducing unit 555 calculates the reproducing cleaning conditions based on the cleaning conditions associated with the current elapsed time, and outputs the reproducing cleaning conditions to the cleaning control unit 51. In this way, it can control the cleaning unit 3 according to the calculated reproducing cleaning conditions.

After the travel control in Step S24 or S25, the travel reproducing unit 555 determines whether or not the autonomous traveling device 100 has reached the determined target position, in Step S26. For instance, if the current position is identical to the target position or within a predetermined range therefrom, it can be determined that the autonomous traveling device 100 has reached the target position.

If the autonomous traveling device 100 has not yet reached the target position ("No" in Step S26), the autonomous travel operation returns to Step S22. In other words, Steps S22 to S25 described above are executed repeatedly until the autonomous traveling device 100 reaches the target position. It should be noted that Steps S22 to S25 described above are executed every control period of the control unit 5.

On the other hand, as a result of the travel control described above, if it is determined that the autonomous traveling device 100 has reached the target position ("Yes" in Step S26), in Step S27 the travel reproducing unit 555 determines whether or not the travel operation stored in the traveling schedule 500 is all performed. The determination whether or not the travel operation stored in the traveling schedule 500 is all performed can be made, for example, by detecting an identifier at the end of the traveling schedule 500 (such as an identifier indicating an "end of file").

As long as it is determined that the travel operation stored in the traveling schedule 500 is not all performed (as long as "No" in Step S27), the autonomous travel operation returns to Step S21. In other words, Steps S21 to S26 described above are executed repeatedly until the travel operation stored in the traveling schedule 500 is all performed.

On the other hand, if it is determined that the travel operation stored in the traveling schedule 500 is all performed ("Yes" in Step S27), execution of the autonomous travel mode is finished.

Figure 25:
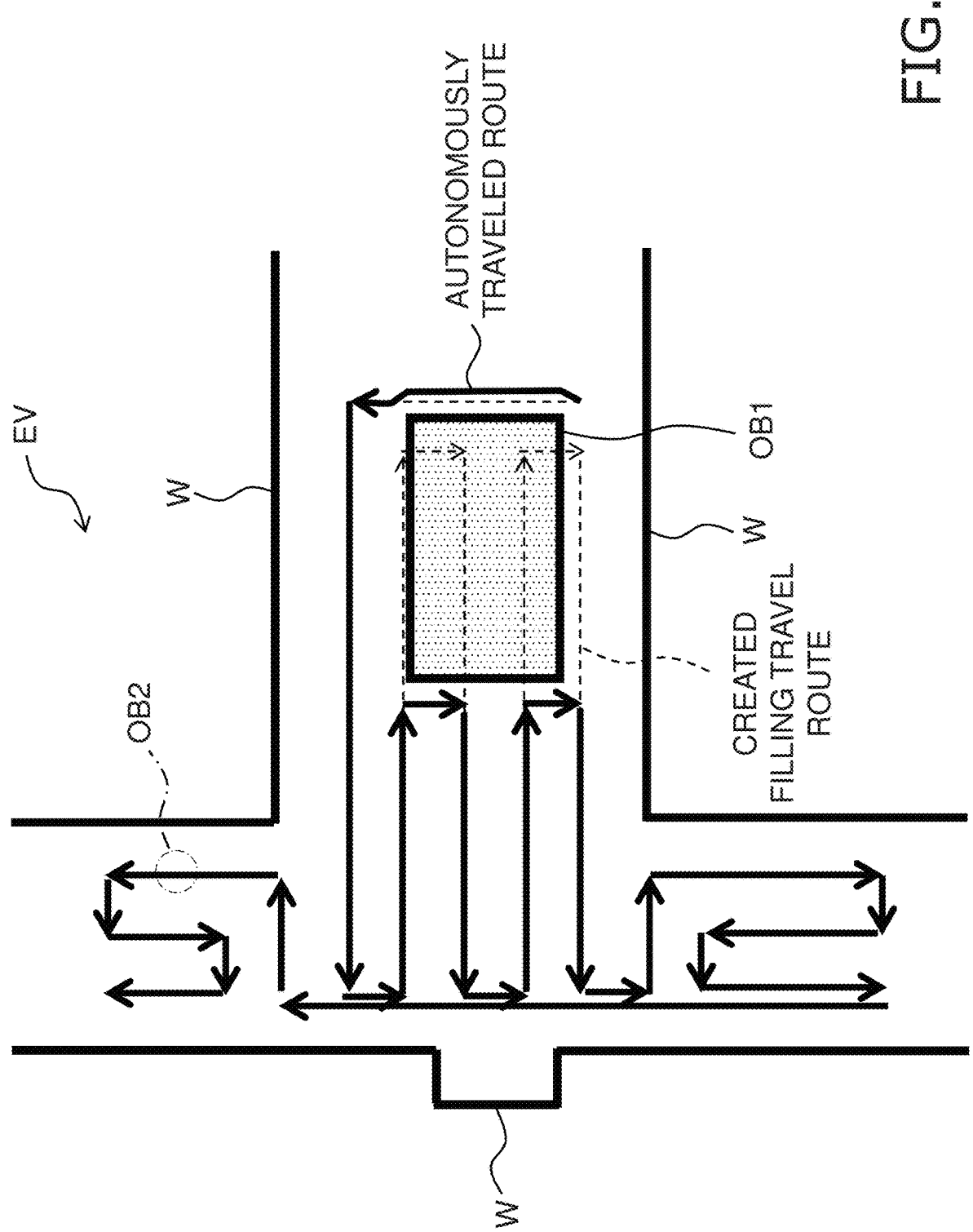
FIG. 25 is a diagram schematically illustrating a specific example of the autonomous travel.

Hereinafter, with reference to FIG. 25, a specific example of the autonomous travel performed by the autonomous traveling device 100 is described. FIG. 25 is a diagram schematically illustrating a specific example of the autonomous travel.

In the following description, the specific example is described in the case where Steps S21 to S27 described above is performed so as to cause the autonomous traveling device 100 to autonomously travel, using the traveling schedule 500 indicating the filling travel route to fill in the travel area TA set in the movement environment EV illustrated in FIG. 9.

In addition, in the movement environment EV illustrated in FIG. 9, it is supposed that there were the obstacles OB1 and OB2 when teaching the outer periphery BO' of the travel area TA and the global map GM, and that the obstacle OB2 is moved out of the movement environment EV when the autonomous travel mode is executed.

As illustrated in FIG. 25, the filling travel route generated by executing Steps S51 to S60 described above (the route shown by broken lines in FIG. 25) is partially overlapped with the obstacles OB1 and OB2. The reason why is that the filling travel route is created using the route creation map SM from which obstacle information I1 and I2 indicating the obstacles OB1 and OB2 are deleted. In other words, the filling travel route is created without considering existence of the obstacles OB1 and OB2.

During performing the autonomous travel mode according to Steps S21 to S27 described above, the autonomous traveling device 100 monitors whether or not an obstacle exists in the movement environment EV. If there is an obstacle on the created filling travel route, the autonomous traveling device 100 autonomously travels so as to avoid the obstacle. In this way, even if the created filling travel route overlaps with the obstacle OB1, OB2, as illustrated in FIG. 25, the autonomous traveling device 100 can autonomously travel according to the created filling travel route while avoiding the obstacle existing when the autonomous travel mode is executed.

Specifically, the autonomous traveling device 100 travels the route to avoid the obstacle OB1, which exists when the manual operation teaching mode or the autonomous travel mode is executed.

On the other hand, at the place where the obstacle OB2 (the obstacle shown by a dot-dashed line in FIG. 25) existed when the manual operation teaching mode was performed, but does not exist when the autonomous travel mode is executed, the autonomous traveling device 100 does not travel the route to avoid the obstacle OB2 but travels according to the created filling travel route.

In other words, the autonomous traveling device 100 can create the filling travel route to appropriately fill in the travel area TA, even if the obstacle OB2 existing in the travel area TA when the global map GM is created will not exist when the autonomous travel is performed.

Further, on the contrary, at the place where the obstacle did not exist when the manual operation teaching mode is executed but exists when the autonomous travel mode is executed, the autonomous traveling device 100 can detect the obstacle when the autonomous travel is performed, so that it can autonomously travel the route to avoid the obstacle.

Second Preferred Embodiment

In the first preferred embodiment described above, when the route creation map SM is created, all obstacle information I1 and I2 existing inside the outer peripheral boundary BO of the travel area TA are deleted unconditionally. In a second preferred embodiment, a specific obstacle information is deleted among obstacle information existing in the travel area TA.

An autonomous traveling device 200 according to the second preferred embodiment is different from the first preferred embodiment only in that the route creation unit 553 selectively delete the obstacle information existing inside the outer peripheral boundary BO, when the route creation map SM is created, and structural elements and functions of the autonomous traveling device 200 according to the second preferred embodiment are the same as those of the autonomous traveling device 100 according to the first preferred embodiment. Therefore, description of other structural elements and functions are omitted here.

In the autonomous traveling device 200, the route creation unit 553 deletes obstacle information matching a predetermined condition among obstacle information existing inside the outer peripheral boundary BO, in Step S53 in the flowchart of FIG. 11 (the step of creating the route creation map SM). This "predetermined condition" is a condition that the obstacle may move out of the travel area TA in a short time.

As the obstacle information that matches the "predetermined condition" described above, for example, there is obstacle information that indicates an obstacle having a predetermined size or smaller among the obstacle information existing inside the outer peripheral boundary BO.

By deleting the obstacle information matching this condition, it is possible to delete a small obstacle information that tends to move and is expected to be out of the travel area TA when the autonomous travel is performed. As a result, an appropriate route creation map SM can be created.

The determination whether or not the obstacle information existing inside the outer peripheral boundary BO is the obstacle information indicating an obstacle having a predetermined size or smaller is made, for example, by a method of recognizing the size of the obstacle by image processing of the obstacle information, a method of calculating the area of the range surrounded by the obstacle information, or the like.

Other than that, as the obstacle information matching the "predetermined condition", for example, there is the obstacle information indicating a dynamic obstacle among the obstacle information existing inside the outer peripheral boundary BO.

By deleting the obstacle information matching this condition, it is possible to delete the obstacle information that is actually moved when teaching the global map GM and the outer periphery BO' and is expected not to exist when the autonomous travel is performed. As a result, the appropriate route creation map SM can be created.

The determination whether or not the obstacle information existing inside the outer peripheral boundary BO is the obstacle information indicating a dynamic obstacle is made, for example, based on whether or not the target obstacle information moves every predetermined time, and/or whether or not the target obstacle information is moving continuously for a predetermined time or longer.

The determination whether or not the obstacle information is moving is made, for example, by a method of recognizing the shape by image processing of the obstacle information and determining whether or not the shape is unnaturally distorted, a method of determining whether or not a plurality of obstacle information exist continuously for the same obstacle, or the like.

It should be noted that also in the second preferred embodiment in which the obstacle information exists in the route creation map SM, the cells C within the area surrounded by the obstacle information (and in vicinity thereof) are determined to be the invalid cells INC in Step S54 described above.

Therefore, using the route creation map SM created in the second preferred embodiment, the filling travel route to avoid the obstacle information remained without being deleted can be created by executing Steps S51 to S60 described above.

Third Preferred Embodiment

In the first preferred embodiment described above, the outer peripheral boundary BO is created by: (i) executing the manual operation teaching mode, so as to move the autonomous traveling device 100 along the outer periphery BO' of the travel area TA, (ii) estimating points that were passed during traveling along the outer periphery BO' of the travel area TA, and (iii) creating the outer peripheral boundary BO as a set of the points.

In other words, in the first preferred embodiment described above, the outer peripheral boundary BO is created by causing the autonomous traveling device 100 to actually travel along the outer periphery BO' of the travel area TA.

In an autonomous traveling device 300 according to a third preferred embodiment, a boundary line corresponding to the outer peripheral boundary BO is drawn on the global map GM, using image editing software such as CAD software, software dedicated to drawing the outer peripheral boundary BO, or the like, and hence the outer peripheral boundary BO is created.

The third preferred embodiment is different from the first preferred embodiment or the second preferred embodiment only in that the outer peripheral boundary BO can be created without executing the manual operation teaching mode, and structural elements and functions of the autonomous traveling device 300 according to the third preferred embodiment are the same as those of the autonomous traveling device 100 according to the first preferred embodiment. Therefore, description of other structural elements and functions are omitted here.

It should be noted that the global map GM may be created by executing the manual operation teaching mode similarly to the first preferred embodiment, or may be created using image editing software such as CAD software, software dedicated to drawing the outer peripheral boundary BO, or the like.

Fourth Preferred Embodiment

As described above, the outer periphery BO' of the travel area TA is taught by causing the autonomous traveling device 100 to travel in the movement environment EV, while the filling travel route to fill in the travel area TA is created by information processing by the route creation unit 553. In other words, the filling travel route is not one that is taught by causing the autonomous traveling device 100 to actually travel along the filling travel route.

In the case described above, the SLAM unit 551 may not be able to perform the position estimation accurately during the autonomous travel of the autonomous traveling device 100 along the filling travel route.

For instance, if the filling travel route is created in a region where there is no obstacle that can be detected by the front detector 41a or the rear detector 41b, or in a region where an obstacle is detected but has a simple shape, a result of map matching between the global map GM and the local map is inaccurate when the autonomous traveling device 100 is in the region. As a result, in the region, the SLAM unit 551 cannot accurately perform the position estimation.

It should be noted that, as the "region where an obstacle is detected but has a simple shape" described above, there is a region that is sandwiched between two linear and parallel walls but has no other obstacle, for example.

Therefore, in an autonomous traveling device 400 according to the fourth preferred embodiment, after the filling travel route is created, the autonomous traveling device 400 "virtually" travels along the filling travel route, and it is determined whether or not the position estimation can be accurately performed in the filling travel route.

The autonomous traveling device 400 according to the fourth preferred embodiment is different from the autonomous traveling device 100 according to the first preferred embodiment, only in that the autonomous traveling device 400 virtually travels along the filling travel route after the filling travel route is created, and that it is determined whether or not the position estimation can be accurately performed in the filling travel route, and other structural elements and functions are the same as those of the autonomous traveling device 100 according to the first preferred embodiment. Therefore, description of other structural elements and functions are omitted here.

Figure 26:
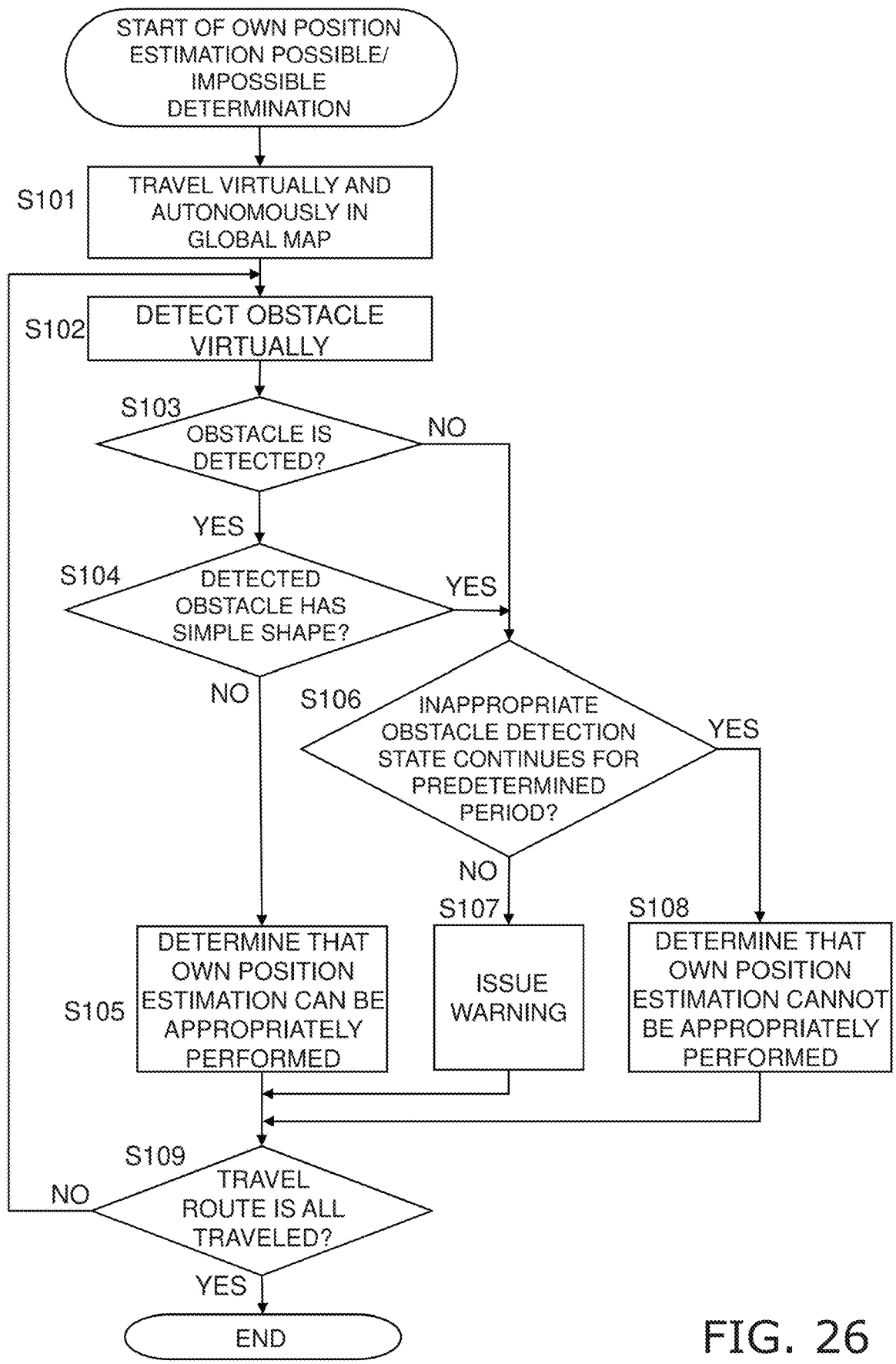
FIG. 26 is a flowchart showing an operation of determining whether or not position estimation can be performed.

Hereinafter, with reference to FIG. 26, an operation of determining whether or not the position estimation can be performed accurately in the filling travel route, by causing the autonomous traveling device 400 to virtually travel along the filling travel route (operation of determining whether or not position estimation can be performed), is described. FIG. 26 is a flowchart showing an operation of determining whether or not the position estimation can be performed. In the following description, the determination operation illustrated in FIG. 26 is performed by the SLAM unit 551.

After creating the traveling schedule 500, in Step S101 the SLAM unit 551 causes the autonomous traveling device 400 to virtually and autonomously travel along the filling travel route in the global map GM.

While virtually and autonomously traveling in the global map GM, in Step S102 the SLAM unit 551 attempts to virtually detect an obstacle (obstacle information) in the global map GM at the current position in the global map GM. Specifically, it attempts to detect the obstacle information as follows.

First, in the global map GM, the SLAM unit 551 virtually outputs a beam L for detecting an obstacle from the front detector 41a and the rear detector 41b radially within the detection ranges of the detectors. Next, the SLAM unit 551 detects obstacle information intersecting the beam L. In this case, it is supposed that the beam intersects only one obstacle information.

Figure 27:
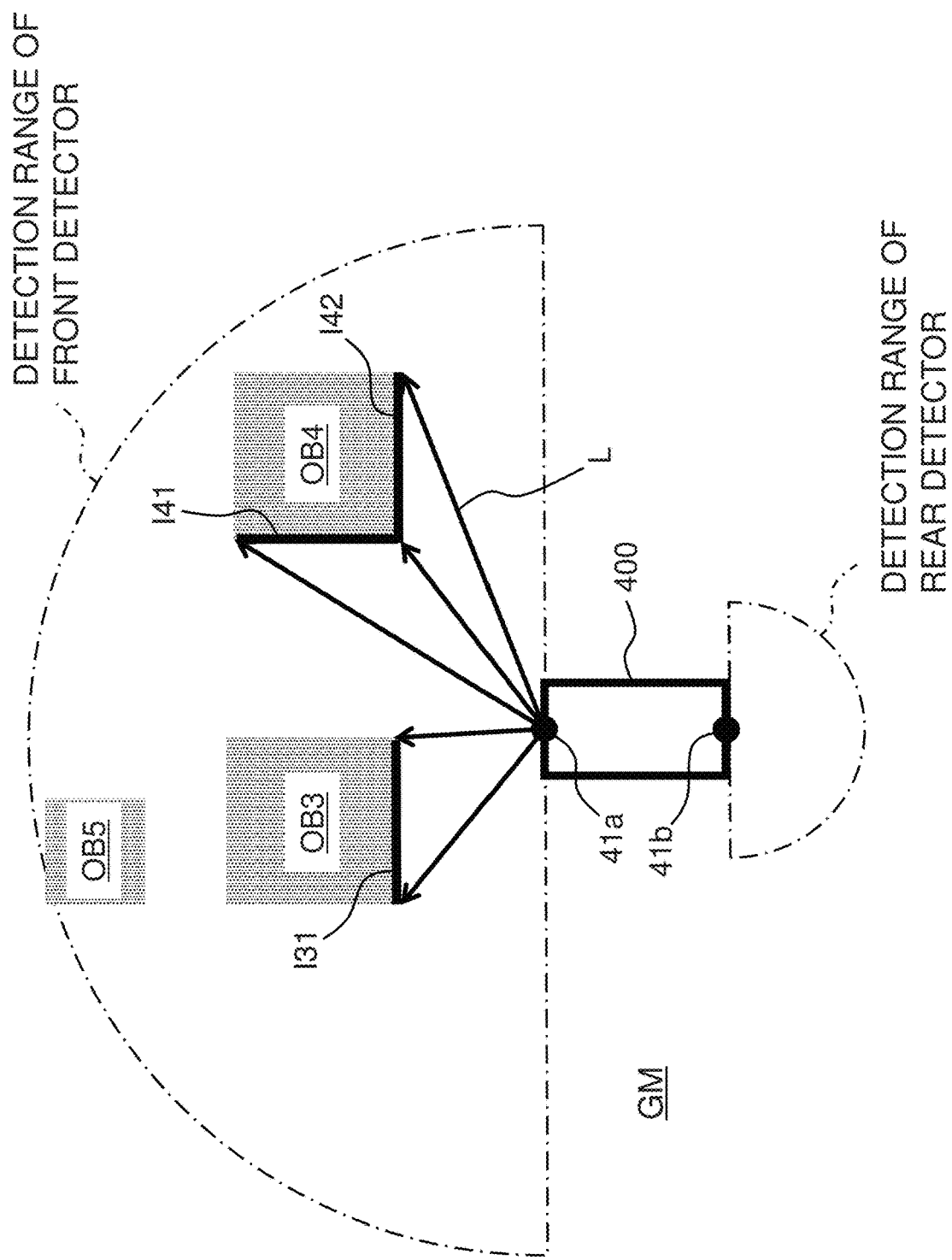
FIG. 27 is a diagram illustrating an example of a detection state of obstacle information in a local map.

When the process described above is performed, if three obstacles OB3 to OB5 exist as illustrated in FIG. 27, obstacle information 131 of the obstacle OB3 and two obstacle information 141 and 142 of the obstacle OB4 are virtually detected. It should be noted that the obstacle OB5 is hidden behind the obstacle OB3 when viewing from the autonomous traveling device 400, and hence obstacle information of the obstacle OB5 is not detected.

FIG. 27 is a diagram illustrating an example of a detection state of obstacle information in the global map.

After attempting to detect obstacle information, the SLAM unit 551 simulates whether or not the autonomous traveling device 400 can perform the position estimation during traveling along the filling travel route, based on the virtual obstacle detection status.

Specifically, the SLAM unit 551 determines whether or not the autonomous traveling device 100 can detect the obstacle at the current position in Step S103. As an example, the SLAM unit 551 calculates the sum of lengths of the detected obstacle information, and determines that the obstacle can be detected if the sum of lengths of the obstacle information is a predetermined value or more.

The sum of lengths of the detected obstacle information corresponds to amount of the obstacle information that can be used for the map matching. Accuracy of the position estimation by the map matching depends on the amount of the obstacle information (the local map) that can be used for the map matching. Therefore, the fact that the sum of lengths of the detected obstacle information is a predetermined value or more means that sufficient amount of the obstacle information (the local map) can be detected so that the position estimation can be accurately performed by the map matching.

If the sum of lengths of the detected obstacle information is a predetermined size or more and if it is determined that the obstacle is detected ("Yes" in Step S103), in Step S104 the SLAM unit 551 further determines whether or not the shape formed by the obstacle information (i.e. the shape of the local map) is a simple shape.

The determination whether or not the shape formed by the detected obstacle information is a simple shape is made, for example, based on a ratio of linear obstacle information facing the same direction, or the like.

Accuracy of the position estimation by the map matching is higher if the global map GM and the local map have characteristic shapes. The reason why is that if these maps have characteristic shapes, there is a tendency that the local map (position and direction thereof) mostly matched with the global map GM can be uniquely determined.

On the other hand, for example, if the shape formed by the detected obstacle information is a simple shape such as two parallel straight lines positioned with a predetermined space therebetween, it may be difficult to determine the local map (position and direction thereof) mostly matched with the global map GM uniquely, and hence accuracy of the position estimation is deteriorated.

It should be noted that the case where the shape formed by the detected obstacle information is a simple shape is, for example, a case where the autonomous traveling device 100 exists in a linear passage sandwiched between two walls.

If the sum of lengths of the detected obstacle information is a predetermined size or more and it is determined that the obstacle is detected ("Yes" in Step S103), and if it is determined that the shape formed by the detected obstacle information (the shape of the detected obstacle) is not a simple shape ("No" in Step S104), in Step S105 the SLAM unit 551 determines that the position estimation can be appropriately performed in the filling travel route (at the current position thereof).

On the other hand, if the sum of lengths of the detected obstacle information is smaller than a predetermined size and it is determined that the obstacle is not detected ("No" in Step S103), or if it is determined that the obstacle is detected but the shape formed by the obstacle information is simple (i.e. the detected obstacle has a simple shape) ("Yes" in Step S104), the SLAM unit 551 determines that the state of the current obstacle detection is inappropriate.

When determining that the state of the current obstacle detection is inappropriate, in Step S106 the SLAM unit 551 determines whether or not the inappropriate state of the obstacle detection has continued for a predetermined period of time or longer.

For instance, if the inappropriate state of the obstacle detection does not dissolve after the autonomous traveling device 100 virtually travels a predetermined distance, it is determined that the inappropriate state of the obstacle detection has continued for a predetermined period of time or longer.

If the inappropriate state of the obstacle detection state has not continued for a predetermined period of time or longer ("No" in Step S106), in Step S107 the SLAM unit 551 issues warning that the position estimation may not be appropriately performed. For instance, the SLAM unit 551 issues warning by generating a warning sound, displaying a warning message on a display screen of the setting unit 9, or other method.

On the other hand, if the inappropriate state of the obstacle detection has continued for a predetermined period of time or longer ("Yes" in Step S106), in Step S108 the SLAM unit 551 notifies the user that the outer peripheral boundary BO is not appropriate, because the position estimation cannot be appropriately performed in a filling route to fill in the outer peripheral boundary BO taught this time. For instance, the SLAM unit 551 performs the notification described above by generating a warning sound, displaying on the display screen of the setting unit 9 that the outer peripheral boundary BO taught this time is not appropriate, or other method.

It should be noted that if the SLAM unit 551 determines that there is a route area in which the position estimation cannot be appropriately performed in the filling travel route, for example, it may stop the position estimation by the map matching at the point included in the route area described above of the traveling schedule 500, and may add a symbol or the like to command to perform the position estimation based on only the amount of rotation of the travel motor 11.

In this way, when autonomous travel along the filling travel route is performed, the SLAM unit 551 can perform the position estimation based on only the amount of rotation of the travel motor 11 at the point assigned with the symbol or the like.

After simulating whether or not the position estimation can be appropriately performed at the current position reached by the virtual autonomous travel, the SLAM unit 551 executes Steps S101 to S108 described above until virtually traveling all the filling travel route indicated in the traveling schedule 500 (as long as "No" in Step S109).

On the other hand, if the simulation whether or not the position estimation can be appropriately performed is completed at all positions on the filling travel route indicated in the traveling schedule 500 ("Yes" in Step S109), the determination operation whether or not the position estimation can be appropriately performed is finished.

By executing Steps S101 to S109 described above, when the autonomous traveling device 100 autonomously travel along the filling travel route, it can predict, before performing the autonomous travel, whether or not the position estimation can be performed using the global map GM and the obstacle information (the local map) when performing the autonomous travel.

In addition, if an obstacle is not detected in Steps S102 to S103 described above, by determining that the position estimation of the autonomous traveling device 400 cannot be performed, it is possible to predict, before the autonomous travel is performed, that an obstacle will not be detected when autonomously traveling along the filling travel route, and that the position estimation will be unable to be performed using the global map GM and the obstacle information (the local map) when performing the autonomous travel.

Furthermore, if the obstacle detected in Steps S102 and S103 described above has a simple shape, by determining that the position estimation of the autonomous traveling device 400 cannot be performed, it is possible to predict, before the autonomous travel is performed, that only a simple shape obstacle will be detected when autonomously traveling along the filling travel route, and that the position estimation will be unable to be performed using the global map GM and the obstacle information (the local map) when performing the autonomous travel, or accuracy of the position estimation may be deteriorated.

Other Preferred Embodiments

Although a plurality of preferred embodiments of the present invention are described above, the present invention is not limited to the preferred embodiments described above, but can be variously modified within the scope of the present invention without deviating from the spirit thereof. In particular, the plurality of preferred embodiments and variations described in this specification can be arbitrarily combined as necessary. In addition, contents of processes shown in the flowcharts, the order of the processes, or the like can be modified without deviating from the spirit of the invention. In addition, any of the processes shown in the flowcharts can be eliminated as necessary.

For instance, in the first preferred embodiment described above, the cell-converted map CM expressing the global map GM as a set of cells C is created, the outer peripheral boundary BO is set in the cell-converted map CM, and after that in Step S53 the obstacle information I1 and I2 existing inside the outer peripheral boundary BO are deleted so as to create the route creation map SM.

Without limiting to this, however, it may be possible, for example, that after setting the outer peripheral boundary BO in the global map GM and deleting the obstacle information I1 and I2 inside the outer peripheral boundary BO, the global map GM after deleting the obstacle information I1 and I2 is converted into a set of cells C so that the route creation map SM can be created.

The autonomous traveling device 100 may be a traveling device other than the cleaning machine that performs cleaning operation autonomously. For instance, the autonomous traveling device 100 may be an advertising robot. Other than that, the autonomous traveling device 100 may include only the traveling unit for autonomously travel (and the control unit for controlling it). In this case, for example, the autonomous traveling device and a robot system for a desired function may be combined so that a robot (device) having a desired function can be provided.

If the autonomous traveling device 100 is a device other than the device that autonomously performs the cleaning operation, the traveling schedule 500 does not store the cleaning conditions. Alternatively, it may store information about control related to usage of the autonomous traveling device 100 instead of the cleaning conditions.

In the fourth preferred embodiment described above, in the filling travel route indicated in the traveling schedule 500, if there is an area for which it is determined that the position estimation cannot be appropriately performed, and after that there is an area for which it is determined that the position estimation can be appropriately performed, the autonomous traveling device 400, which performs the autonomous travel, may perform the position estimation by the map matching between the global map GM and the local map, and may cancel an estimated error accumulated when passing through the area in which the position estimation cannot be appropriately performed, when it enters the area where the position estimation can be appropriately performed after passing through the area where the position estimation cannot be appropriately performed.

Preferred embodiments of the present invention and combinations or modifications thereof can be widely applied to autonomous traveling devices that can autonomously travel to fill in a travel area set in a movement environment, and can travel while avoiding obstacles existing in the travel area.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous travel route planning method for an autonomous traveling body to autonomously travel to fill in a travel area set in a movement environment, and to travel while avoiding obstacles existing in the travel area, the method comprising:
    creating a first map including obstacle information indicating an obstacle that exists in the movement environment;
    setting an outer peripheral boundary of the first map as an outer peripheral boundary of a second map, the outer peripheral boundary of the second map corresponding to an outer periphery of the travel area;
    creating the second map in which the obstacle information existing inside the outer peripheral boundary of the second map is deleted, the second map being created from the first map and as a map independent from the first map;
    creating a filling travel route to fill in the travel area included in the second map;
    causing the autonomous traveling body to autonomously travel along the filling travel route; and
    when the autonomous traveling body autonomously travels along the filling travel route, estimating a position of the autonomous traveling body based on the first map.

2. The autonomous travel route planning method according to claim 1, wherein in creating the second map, all the obstacle information existing inside the outer peripheral boundary of the second map are deleted.

3. The autonomous travel route planning method according to claim 1, wherein in creating the second map, obstacle information that matches a predetermined condition among the obstacle information existing inside the outer peripheral boundary of the second map is deleted.

4. The autonomous travel route planning method according to claim 3, wherein the obstacle information that matches a predetermined condition is information indicating an obstacle having a predetermined size or smaller among the obstacle information existing inside the outer peripheral boundary of the second map.

5. The autonomous travel route planning method according to claim 3, wherein the obstacle information that matches a predetermined condition is information indicating a moving obstacle among the obstacle information existing inside the outer peripheral boundary of the second map.

6. The autonomous travel route planning method according to claim 1, further comprising:
    virtually causing the autonomous traveling body to detect an obstacle while virtually causing the autonomous traveling body to travel along the filling travel route in the first map; and
    determining whether or not the autonomous traveling body can perform a position estimation during traveling along the filling travel route, based on a virtual obstacle detection status.

7. The autonomous travel route planning method according to claim 6, wherein in the determining whether or not the autonomous traveling body can perform the position estimation, it is determined that the autonomous traveling body cannot perform the position estimation in a case where an obstacle is not detected in the virtually causing the autonomous traveling body to detect an obstacle.

8. The autonomous travel route planning method according to claim 6, wherein in the determining whether or not the autonomous traveling body can perform the position estimation, it is determined that the autonomous traveling body cannot perform the position estimation in a case where the obstacle detected in the virtually causing the autonomous traveling body to detect an obstacle has a simple shape.

9. The autonomous travel route planning method according to claim 6, wherein in the determining whether or not the autonomous traveling body can perform the position estimation, it is determined that the autonomous traveling body cannot perform the position estimation in a case where an obstacle is not detected in the virtually causing the autonomous traveling body to detect an obstacle, or in a case where the detected obstacle has a simple shape for a predetermined period of time or longer.

10. The autonomous travel route planning method according to claim 1, wherein the setting the outer peripheral boundary of the first map includes:
    causing the autonomous traveling body to move along the outer periphery of the travel area;
    estimating passing points that are passed during movement along the outer periphery of the travel area; and
    setting a set of the passing points as the outer peripheral boundary of the first map.

11. The autonomous travel route planning method according to claim 1, wherein the setting the outer peripheral boundary of the first map includes drawing a boundary line corresponding to the outer peripheral boundary in the first map.

12. An autonomous traveling method performed by an autonomous traveling body to autonomously travel to fill in a travel area set in a movement environment, the method comprising:
    creating a first map including obstacle information indicating an obstacle that exists in the movement environment;

setting an outer peripheral boundary of the first map as an outer peripheral boundary of a second map, the outer peripheral boundary of the second map corresponding to an outer periphery of the travel area;

creating the second map in which obstacle information existing inside the outer peripheral boundary of the second map is deleted, the second map being created from the first map and as a map independent from the first map;

creating a filling travel route to fill in the travel area included in the second map;

determining a current position of the autonomous traveling body based on the first map;

determining whether or not an obstacle exists in an interference region on a future travel route from the determined current position to a target position on the filling travel route; and causing the autonomous traveling body to travel along the future travel route in a case where no obstacle exists in the interference region, while causing the autonomous traveling body to travel along an avoidance route planned to avoid the obstacle in a case where an obstacle exists in the interference region.

13. A non-transitory computer-readable medium including a program that causes a computer to execute the method according to claim 1.

* * * * *